United States Patent
Hall et al.

(10) Patent No.: US 9,996,809 B2
(45) Date of Patent: Jun. 12, 2018

(54) APPARATUS AND METHOD FOR TRACKING AND GATHERING INFORMATION ASSOCIATED WITH ASSETS

(71) Applicant: NewVistas, LLC, Provo, UT (US)

(72) Inventors: David R. Hall, Provo, UT (US); Davido L. Hyer, Spanish Fork, UT (US); Richard D. Brinkworth, Spanish Fork, UT (US)

(*) Notice: Subject to any disclaimer, the term of this patent is extended or adjusted under 35 U.S.C. 154(b) by 11 days.

(21) Appl. No.: 14/740,252

(22) Filed: Jun. 15, 2015

(65) Prior Publication Data
US 2015/0364017 A1    Dec. 17, 2015

Related U.S. Application Data

(60) Provisional application No. 62/011,664, filed on Jun. 13, 2014, provisional application No. 62/015,996, filed on Jun. 23, 2014, provisional application No. 62/087,124, filed on Dec. 3, 2014.

(51) Int. Cl.
| G06Q 10/06 | (2012.01) |
| G06Q 20/14 | (2012.01) |
| G06Q 30/04 | (2012.01) |
| G08B 5/36 | (2006.01) |
| G08B 7/06 | (2006.01) |
| G08B 21/02 | (2006.01) |

(52) U.S. Cl.
CPC . *G06Q 10/06313* (2013.01); *G06Q 10/06315* (2013.01); *G06Q 10/063118* (2013.01); *G06Q 20/14* (2013.01); *G06Q 30/04* (2013.01); *G08B 5/36* (2013.01); *G08B 7/06* (2013.01); *G08B 21/0272* (2013.01)

(58) Field of Classification Search
CPC ..... G06Q 10/06313; G06Q 10/063118; G06Q 10/06315; G06Q 20/14; G06Q 30/04; G08B 5/36; G08B 7/06; G08B 21/0272
See application file for complete search history.

(56) References Cited

U.S. PATENT DOCUMENTS

| 5,796,056 A * | 8/1998 | Bredow | H01H 13/64 200/1 B |
| 6,323,566 B1 * | 11/2001 | Meier | G07C 9/00309 180/287 |
| 8,356,362 B1 * | 1/2013 | Robertson | A41D 19/01594 2/16 |
| 2002/0032664 A1 * | 3/2002 | Ikuta | G06Q 20/123 705/73 |
| 2008/0221715 A1 * | 9/2008 | Krzyzanowski | H04L 12/2805 700/90 |

(Continued)

Primary Examiner — James Yang

(57) ABSTRACT

A method for automatically tracking assets and gathering information associated therewith is disclosed. Such a method includes attaching a tracking beacon to an asset and wirelessly monitoring, with an asset tracking system, a location of the asset using the attached tracking beacon. The method further enables a user to manually input information associated with the asset using an input element (e.g., button, directional switching device, touchscreen, etc.) incorporated into the tracking beacon. The method wirelessly transmits the information from the tracking beacon to the asset tracking system. A corresponding system and computer program product are also disclosed herein.

8 Claims, 20 Drawing Sheets

(56) References Cited

U.S. PATENT DOCUMENTS

2013/0154923 A1* 6/2013 Mock .................... G06F 3/0236
345/157
2014/0267032 A1* 9/2014 Chandel ................ G06F 3/0346
345/158

* cited by examiner

APPARATUS AND METHOD FOR TRACKING AND GATHERING INFORMATION ASSOCIATED WITH ASSETS

RELATED APPLICATIONS

This application claims priority to U.S. Provisional Patent No. 62/011,664 filed on Jun. 13, 2014 and entitled "Systems and Methods for Automating Allocations, for Automating and Incentivizing Business Processes, and for Cooperative Networking of Businesses and Individuals"; U.S. Provisional Patent No. 62/015,996 filed on Jun. 23, 2014 and entitled "Wireless Beacon Hardware and Systems Platform"; and U.S. Provisional Patent No. 62/087,124 filed on Dec. 2, 2014 and entitled "Wireless Asset Management System".

BACKGROUND

Field of the Invention

The invention relates to systems and methods for wirelessly tracking, managing, and controlling assets; automating allocations; and facilitating cooperative networks of businesses.

Background of the Invention

Allocating and managing/using allocations in business operations of all kinds has historically involved a mix of manual and automated processes: workers in production plants, hospitals, law offices, and the like manually allocate time (time on site, labor time by project/customer, etc.), manually allocate use of assets/resources (locations, machinery, vehicles, etc.), and manually allocate expenses. The manual time and expense allocations are vital for the business systems that take care of payroll, customer billing, maintenance, and so on. These downstream processes are where the bulk of automation exists in existing systems, but manual elements are involved to some extent in all of them, and the upstream allocation processes are almost exclusively manual in nature.

Some existing systems may allow for automatic allocations, but only in a very limited sense. The automation in these existing systems is applied only in strictly-defined situations and must be set up with a manual process. Increasing the automation of allocations without sacrificing accuracy is highly desirable in that manual allocations take time away from more essential functions and are subject to intentional and unintentional omissions, data entry errors, mistakes related to poor judgment, and poor recollection. Operations of all sizes must deal with these problems, and larger and more complex operations are subject to larger and more complex errors, which frequently are addressed by adding layers of control/management, each with its own share of manual allocation processes and their accompanying problems and inefficiencies.

In view of the foregoing, what are needed systems and methods to more effectively track, manage, and control assets. Ideally, such systems and methods will enable various types of allocations (e.g., time, use, expenses) to be automated.

SUMMARY

The invention has been developed in response to the present state of the art and, in particular, in response to the problems and needs in the art that have not yet been fully solved by currently available systems and methods. Accordingly, improved systems and methods have been developed to wirelessly track, manage, and control assets, as well as automate allocations. Features and advantages of different embodiments of the invention will become more fully apparent from the following description and appended claims, or may be learned by practice of the invention as set forth hereinafter.

In a first embodiment of the invention, a method for automatically allocating the time of an individual to a project is disclosed. Such a method includes associating a project with a location, such as the location of an asset (e.g., machine, equipment, room, area, etc.), and tracking proximity of an individual to the location. A "project" may include work associated with a particular client, work order, assignment, or the like. A "location" may include a stationary or changing (i.e., mobile) location. The method further determines an amount of time that the individual is deemed to be proximate (e.g., near or within a specified distance or vicinity of) the location. The method automatically allocates time of the individual to the project during the time the individual is proximate the location. In certain embodiments, the method further enables the individual to manually adjust the time that is allocated to the project during the time the individual is proximate the location. A corresponding system and computer program product are also disclosed herein.

In a second embodiment of the invention, a method for automatically allocating the time of an asset is disclosed. Such a method includes tracking proximity of a first asset relative to a second asset. The first asset may include, for example, a work order or one or more individuals. The second asset may include, for example, a piece of equipment, a room, or a work area. The method determines a duration of time the first asset is deemed to be proximate the second asset. In accordance with the duration of time, the method automatically allocates time of the second asset to at least one of the first asset, an entity associated with the first asset, and a project associated with the first asset. A corresponding system and computer program product are also disclosed herein.

In a third embodiment of the invention, a method for automatically determining allocations of time or use is disclosed. Such a method includes gathering, using at least one sensor, environmental information describing an environment around an entity. The entity includes at least one of a person and a physical asset. The method further determines what supplemental information is needed to supplement the environmental information in order to determine an allocation for the entity, wherein the allocation includes at least one of an allocation of time and an allocation of use. The method is configured to automatically request the supplemental information from an individual. The method is further configured to receive the supplemental information from the individual and use the environmental information and supplemental information to determine the allocation for the entity. A corresponding system and computer program product are also disclosed herein.

In a fourth embodiment of the invention, a method for automatically allocating use of an asset is disclosed. Such a method includes tracking proximity of a first asset relative to a second asset and determining when the first asset is proximate the second asset. The method further senses use of the second asset while the first asset is proximate the second asset. Sensing use may include sensing vibration of the second asset, temperature of the second asset, electrical current drawn by the second asset, or the like. The method automatically allocates use of the second asset to at least one of the first asset, an entity associated with the first asset, and a project associated with the first asset. A corresponding system and computer program product are also disclosed herein.

In a fifth embodiment of the invention, a method for automatically tracking assets and gathering information associated therewith is disclosed. Such a method includes attaching a tracking beacon to an asset and wirelessly monitoring, with an asset tracking system, a location of the asset using the attached tracking beacon. The method further enables a user to manually input information associated with the asset using an input element (e.g., button, directional switching device, touchscreen, etc.) incorporated into the tracking beacon. The method wirelessly transmits the information from the tracking beacon to the asset tracking system. A corresponding system and computer program product are also disclosed herein.

In a sixth embodiment of the invention, a method for facilitating transactions between a network of businesses includes determining, for a given time period, a first invoice directed from a first business to a second business, and a second invoice directed from the second business to the first business. The method further includes aggregating the first and second invoices to determine a net payment needed to pay both the first invoice and the second invoice. The net payment is transferred between the first business and the second business. The method further includes updating an accounting platform for each of the first business and the second business to indicate that the first invoice and the second invoice have been paid.

In a seventh embodiment of the invention, a method includes establishing a cooperative network of businesses, establishing a first entity configured to own and invest in intellectual property assets utilized by the cooperative network of businesses; and establishing a second entity configured to own and invest in physical assets shared and utilized by the cooperative network of business.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
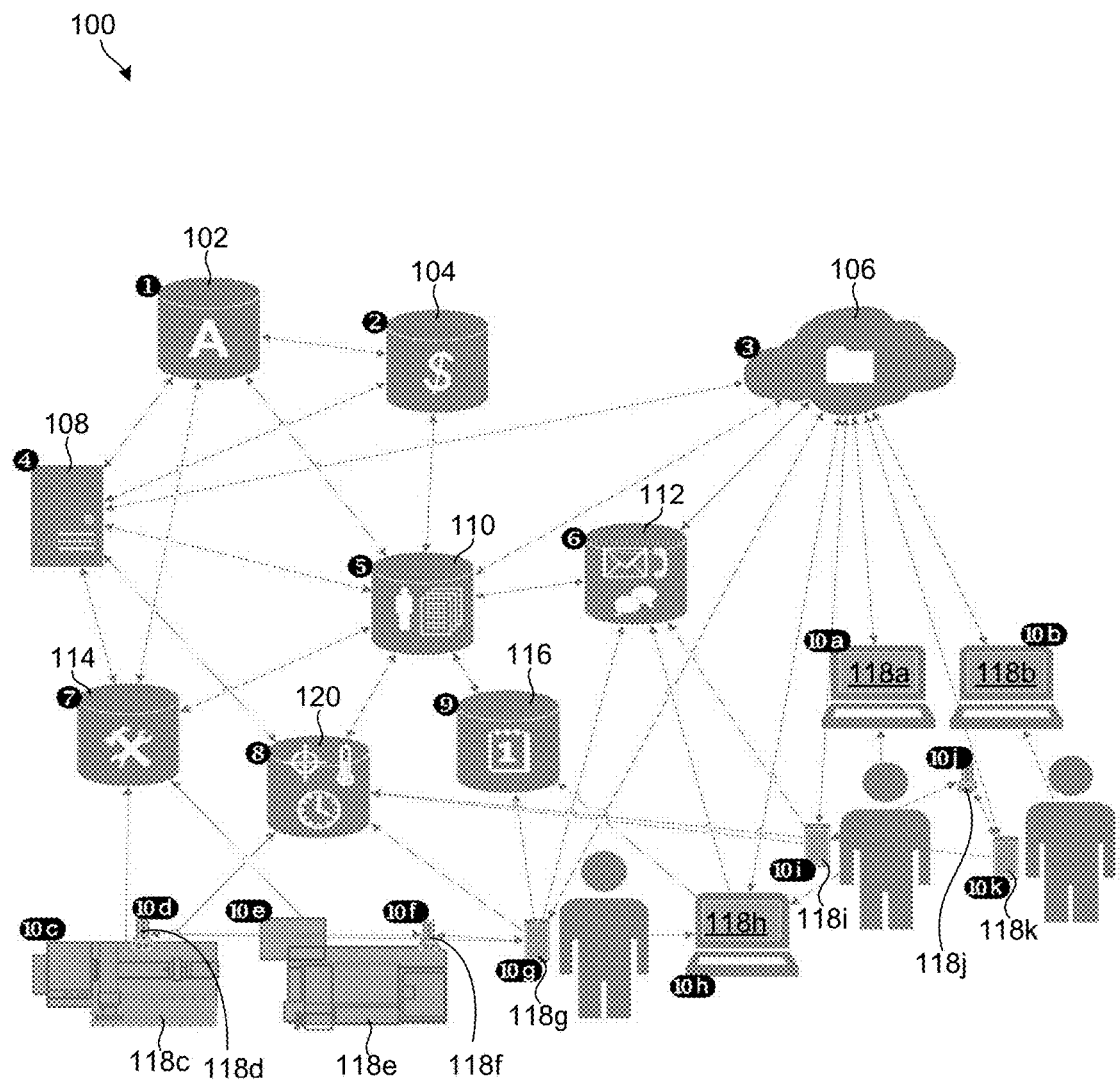
FIG. 1 is a high level diagram showing one embodiment of a system for automating allocations.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The embodiments of the invention described herein resolve problems associated with manual allocations and existing automatic allocation solutions. This is at least partly accomplished by bringing together information from disparate sources and using an algorithm to, in full or in part, automatically and predictively allocate time, assets/resources, expenses, etc. Source information may originate from any number of independent systems. These systems may individually or collectively provide or gather one or more of the following types of information: locations of people, locations of assets, use of assets, use of communications systems, use of software, use of digital resources, monetary transactions, scheduled and unscheduled events, and the like. The systems may also provide or gather information regarding the duration and/or frequency for any or all of the items listed above, as well as intersections for any or all of the items listed above (i.e., this person at this location used this software to access this digital resource at this time, etc.).

An automatic allocation algorithm in accordance with the invention may be designed to work with any information provided, and does not require all the data types listed above. As information is passed to the automatic allocation algorithm, it may combine new details with historic trends and other user input. The algorithm may process all input and then output allocations that are automatically associated with one or more people, assets, or other elements in independent systems or in the systems providing the inputs.

The allocations generated by the algorithm described above may be edited and/or automatically updated as more information is gathered, and/or may be used to trigger other actions within the originating systems and/or other independent systems. Ideally, all source information is collected automatically and all allocations are automatically and completely determined. However, the system may also be designed to use any amount of manually-entered information, and the system may be beneficial even if it only makes partially-complete allocations with the information provided. The system may, in certain embodiments, be configured to accept manual edits to past output, using these edits as a training component. Furthermore, the algorithm may be configured to weight input and output based on manual and/or automated factors, to account for the incompleteness and/or the trustworthiness of the information source or sources.

Referring to FIG. 1, one embodiment of a system 100 for automating allocations is illustrated. As shown, the system 100 includes a database 102 of allocations, or allocation database 102, the purpose of which will be described in more detail hereafter. The system 100 further includes an accounting system 104 and database 104 that includes information and functions related to projects and billing codes, customer management/invoicing, capitalizing/expensing costs and/or assets, tracking and managing costs of products and services provided internally and externally, and the like. A file system 106 and related information 106 may contain or generate information regarding who has accessed particular files, which software was used, and the like. An analysis/processing system 108 may receive information from all of the other systems/sources and process this information using an allocation algorithm to determine the allocations discussed above. The analysis/processing system 108 may send the resulting allocations to the allocations database 102 and other systems as applicable.

In certain embodiments, the system 100 may further utilize a database 110 of personnel, assets, and/or projects. Although this database 110 is shown to be a single database 100, the information contained therein may be distributed across multiple different databases. The system 100 may also, in certain embodiments, reference a database 112 of information related to use of communication services (voice calls, text messages, e-mail messages, etc.). This database 112 may contain all content of the communications or only metadata such as type of communication, sender, receiver, duration, and so forth.

The system 100 may also utilize a maintenance scheduling/tracking system 114 and database 114 that ties into personnel records, asset records, scheduling records, and the like. Among other tasks, this system 114 may track assignments of assets to people and/or projects, periodic and unscheduled maintenance, and repairs based on the use/needs of individual projects. The system 100 may also utilize a scheduling system 116 and database 116 containing information on timing and duration of events as well as the people/assets associated therewith.

The system 100 may also, in certain embodiments, reference information gathered from mobile and stationary computer systems 118 and beacons 118. These computer systems and beacons may be registered such that a location, person, and/or asset is affiliated therewith. The devices/beacons may be configured to collect and report information on a periodic basis. Information collected may include software that is used, location data, duration data, proximity of other people/assets, signal strength, temperature, light intensity, humidity, vibration, pressure, current, and the like. This information may, in certain embodiments, be stored in a database 120.

The analysis and processing system 108 may not require inputs from all sources shown in order to function properly. Sources may be added or removed as needed, as time, cost, and compatibility constraints allow. Similarly, all information generated within the system 100 does not have to be available at one time. Rather, scheduling constraints may limit when processing is finalized, when updates can occur, etc. Although all beacon-type devices shown in FIG. 1 only pass information to mobile devices which in turn pass information to database-type systems, this is not meant to be a limiting condition. Beacons may also be designed and configured in such a way that they pass information directly to the databases described in association with FIG. 1.

Figure 2:
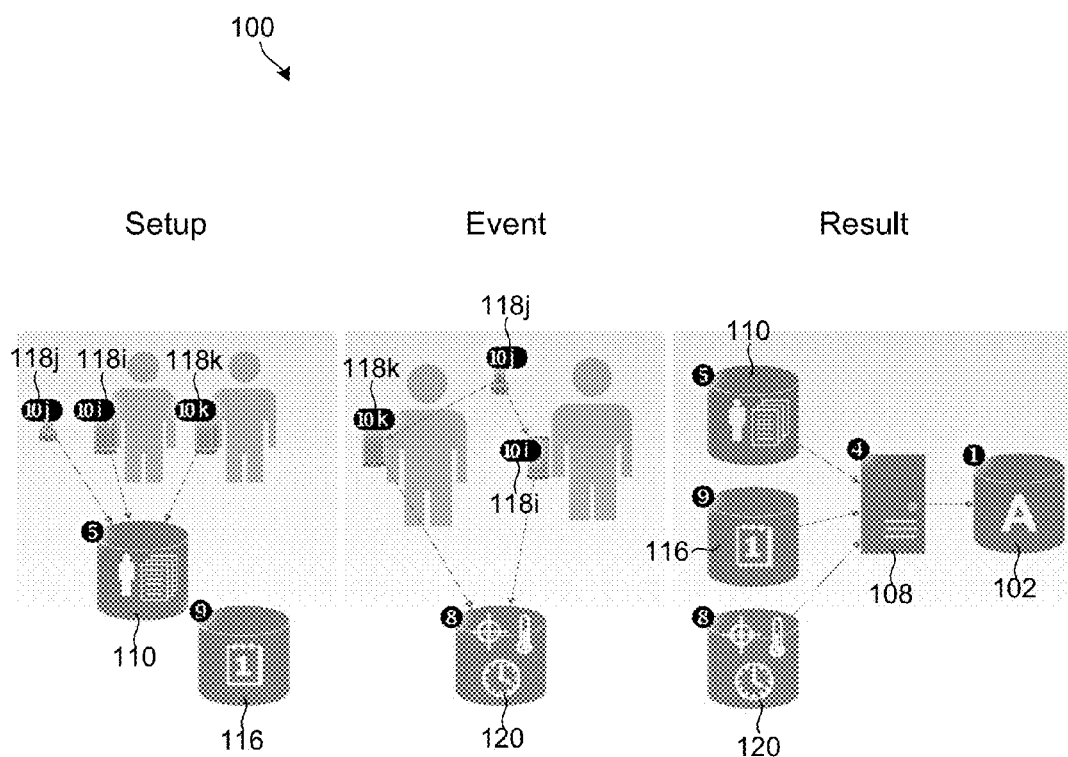
FIG. 2 is a high level diagram showing how the system of FIG. 1 may be used to automatically allocate time to people and projects.

Referring to FIG. 2, a real-world example of how a system 100 in accordance with the invention may be used to automatically allocate time to people and projects is illustrated. As shown, the system 100 is set up such that a beacon 118j is associated with a conference room in the personnel/assets/projects database 110. Two mobile devices 118i and 118k are associated with two individuals in this same database 110. In the scheduling system 116, the conference room associated with the beacon 118j is also associated with a specific project in the personnel/assets/projects database 110 from 9:00 to 11:00 on a given day.

All applicable information may be passed to the analysis/processing system 108, which may automatically create entries in the allocations database 102. In this example, assume that entries are created in the allocations database 102 for three hours of time to the appropriate project for each person involved. In this example, the system 100 uses actual results (i.e., the number of hours actually spent in the conference room) to allocate three hours for each person rather than just the two hours scheduled in the personnel/assets/projects database 110.

In certain embodiments, other individuals may be associated with the meeting and have allocations created even if the individuals are not physically present in the meeting. For example, an individual's participation in a meeting may be determined by awareness of a standard work location of the invitees and/or presence of a call-in number in a scheduling system entry for the meeting and/or knowing that an individual has joined the meeting by phone (based on information in the communication services database 112). Even if some or all invitees do not have registered mobile devices, their presence may be determined based on door access (if a security system feeds information to the database 120 of times, places, etc.), lack of activity on the file system 106 during the meeting time, or the like. If invitees do have registered mobile devices, their absence may be determined if their mobile devices are detected at a different location during the meeting.

Figure 3:
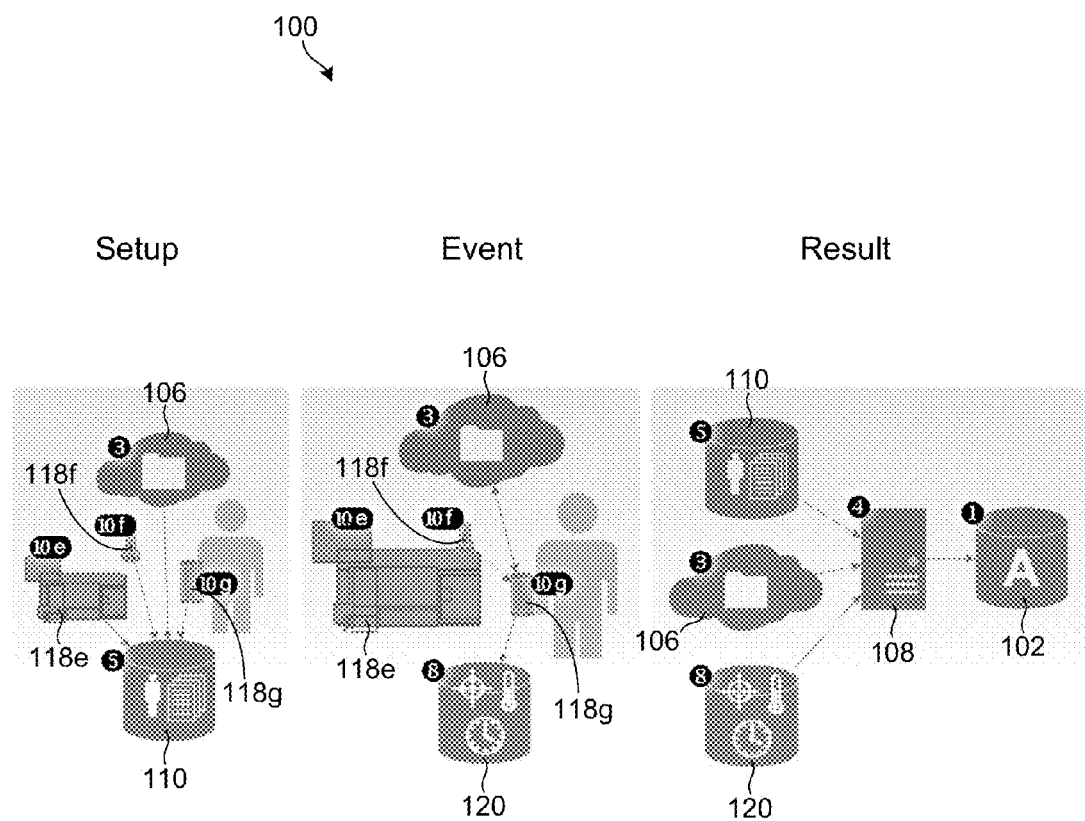
FIG. 3 is a high level diagram showing how the system of FIG. 1 may be used to automatically allocate time to assets and projects.

Referring to FIG. 3, a real-world example of how a system 100 may be used to automatically allocate time to assets and projects is illustrated. As shown, the system 100 is set up such that a beacon 118f is associated with an asset 118e in the personnel/assets/projects database 110. A mobile device 118g is registered to an individual in this same database 110, as are certain digital assets in the file system 106, either explicitly or by way of association with past allocations.

On a given day, the beacon 118f reports close proximity of the mobile device 118g from 9:00 to 10:00, and also reports vibrations characteristic of asset use during that time. The mobile device 118g is used during this time to access the digital assets referenced above. This information is passed to the appropriate database 120. All applicable information is passed to the analysis/processing system 108, which automatically creates entries in the allocations database 102. In this case, the entries allocate one hour of time to the appropriate project for both the person who registered the mobile device 118g and the asset 118e itself.

Another possible approach for the above-described workflow may not involve or depend on the file-system awareness described above. Instead, a beacon may be attached or connected to a work-in-progress traveler and/or the workin-progress itself. Automatic allocations may occur in accordance with movements of the traveler based on proximity of registered/associated assets and individuals. One benefit of this kind of tracking is that it may provide additional insights with respect to process delays, costs of storage, or the like.

Figure 4:
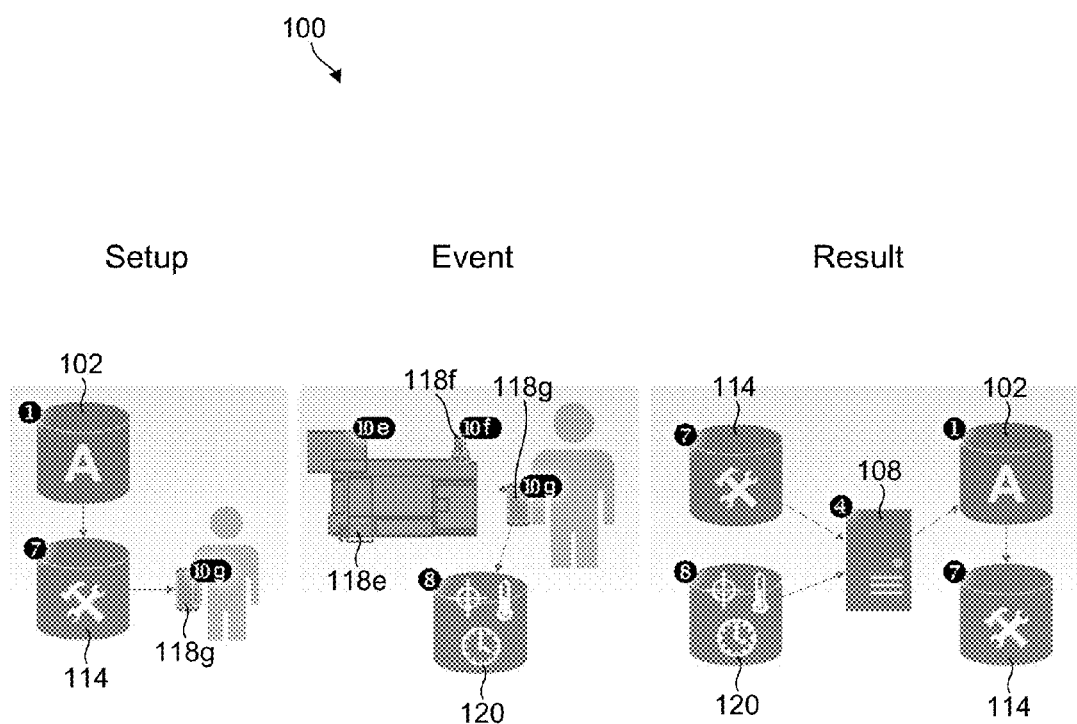
FIG. 4 is a high level diagram showing how the system of FIG. 1 may be used to automatically allocate time to maintenance tasks.

Referring to FIG. 4, a real-world example of how a system 100 in accordance with the invention may be used to automatically allocate time to maintenance tasks is illustrated. Continuing with the example described in association with FIG. 3, assume that as soon as an hour of use is allocated to the asset 118e, it crosses an hours-of-use threshold established in the maintenance system 114. This triggers a maintenance task. In this example, the maintenance system 114 alerts a person, using a mobile device 118g, that is registered as someone qualified to perform the task.

The beacon 118f subsequently detects the proximity of the mobile device 118g from 11:00 to 3:00. This information is passed to the appropriate database 120. All applicable information is passed to the analysis/processing system 108, which automatically generates entries in the allocations database 102. In this example, the entries may allocate four hours of time to the appropriate maintenance task to both the person associated with the registered mobile device 118g and to the asset 118e. The allocation information may also be passed to the maintenance system 114, which may in turn prompt the user for confirmation that the task is complete, and/or reset the hours-of-use for the asset 118e since performance of the last maintenance task.

In certain embodiments, the system 100 may be configured to treat all work performed by certain individuals as maintenance related. This work/time may be allocated to related projects and/or may be used to modify overhead cost calculations. Janitorial staff, for example, may move from place to place through an entire facility. If a certain room or work area is used for three projects between cleanings, and project A has used it for fifty percent of the time, while projects B and C have each used it for twenty-five percent of the time, the cleaning time may be allocated proportionally to all three projects. In other embodiments, all cleaning may be treated as an overhead cost, and grouped with utilities or the like as the basis for a usage rate assigned to a facility and/or room/work area. The usage rate may be fixed for a given period of time or may be automatically adjusted to reflect allocations as they occur.

Figure 5:
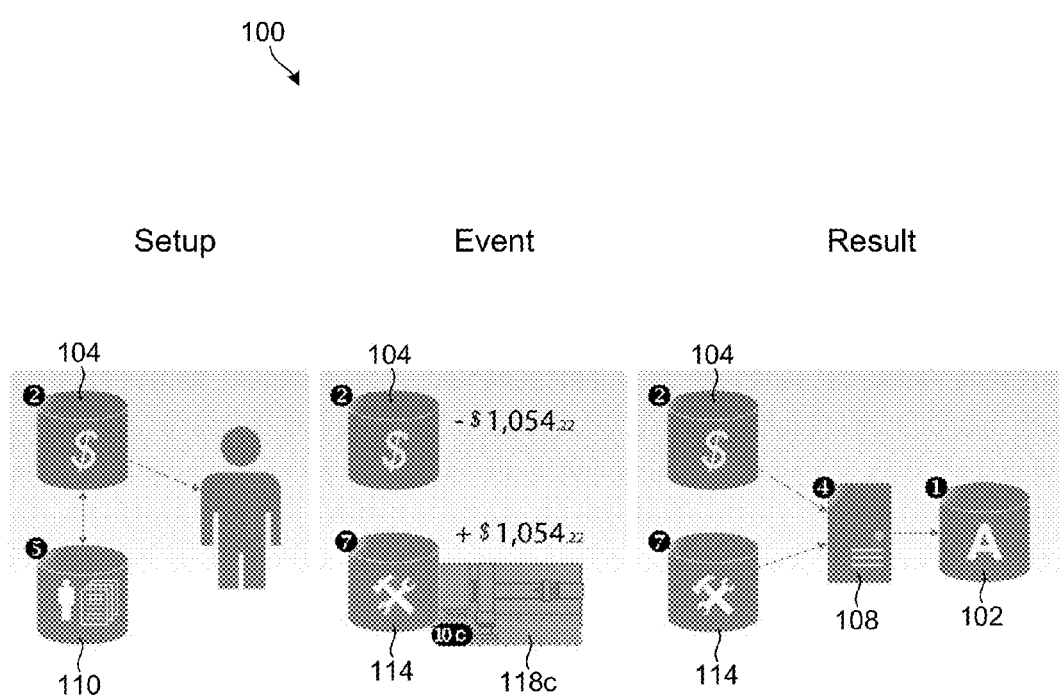
FIG. 5 is a high level diagram showing how the system of FIG. 1 may be used to automatically allocate expenses to assets.

Referring to FIG. 5, a real-world example of how a system 100 in accordance with the invention may be used to automatically allocate expenses to assets is illustrated. In this example, a credit card is associated with a person in the personnel/assets/projects database 110 and in the accounting system 104.

Assume that the accounting system 104 processes an expense for $1,054.22 charged to the credit card. Within a few days (before or after), an asset 118c in the maintenance system 114 is upgraded and the value assigned is increased by $1,054.22. All applicable information is passed to the analysis/processing system 108, which automatically creates an entry in the allocations database 102 that allocates $1,054.22 to the appropriate asset. While not shown, other allocations may also occur at this time (e.g., expense allocations totaling $1,054.22 for projects that have recently used the asset, adjustments of the burden rate of the asset, etc.).

Figure 6:
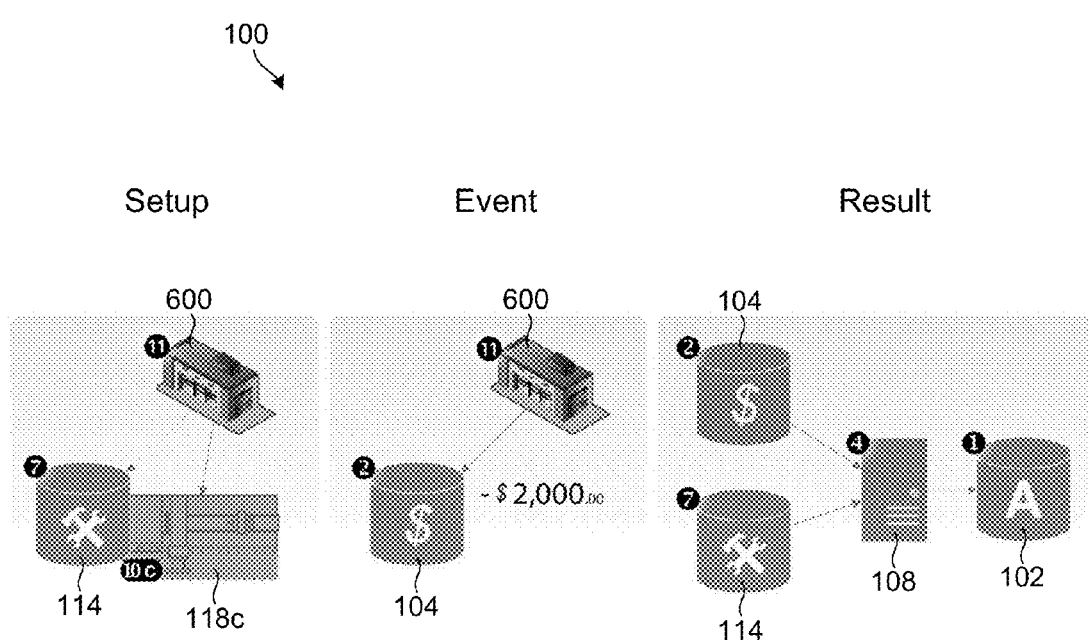
FIG. 6 is a high level diagram showing how the system of FIG. 1 may be used to automatically allocate expenses to maintenance tasks.

Referring to FIG. 6, a real-world example of how a system 100 in accordance with the invention may be used to automatically allocate expenses to maintenance tasks is illustrated. As shown, an outside company 600 is associated with a maintenance contract for an asset 118c in the maintenance database 114.

Assume that the accounting system 104 processes a $2,000 invoice from the company 600. All applicable information is passed to the analysis/processing system 108, which automatically creates an entry in the allocations database 102 that allocates $2,000 to the maintenance of the asset 118c in the maintenance database 114. In certain embodiments, the system 100 may be configured to send a notification to a person on record as the asset manager.

Although the examples discussed in FIGS. 2 through 6 automatically perform various allocations without user intervention, the system 100 may also be configured to accept some amount of manually input information. For example, continuing with the example discussed in association with FIG. 6, assume that the accounting system 104 processes an invoice for $5,000 from a company associated with a specific project in the personnel/assets/projects database 110. The analysis/processing system 108 may be configured to automatically allocate $5,000 to the appropriate project. However, assume for the sake of example that information form a chart of accounts is required for the allocation, and that the analysis/processing system 108 is unable to determine the correct chart of accounts selection. As a result, the analysis/processing system 108 sends notice of an incomplete allocation to a person in the personnel/assets/projects database 110 associated with the project. In certain embodiments, this person is selected based on an explicit designation as a project manager, or based on being a principle source of past allocations. The person may then fill in the missing information so that the analysis/processing system 108 can complete the allocation.

In other embodiments, if a company is not explicitly associated with a specific project, it may still be associated based on matching past expense allocations in the allocations database 102. If past allocations correlate with two projects rather than one, and if time stamp information does not clearly favor one project over the other, the system 100 may request not only chart of accounts information, but also present the person providing the manual input with both options and prompt him or her to choose one or split the expense between both (equally or otherwise).

Further variations are also possible. For example, if no prior allocations match in the allocations database 102, matching contact information in the communications database 112 may be used to notify a person associated with a device that was the source of the matching contact information. This system may compare other allocations from other persons in the same or similar situations and systematically create a list of potential allocations as options for this specific allocation. The person can then select the correct allocation from the list or manually enter a new allocation.

In situations where an allocation cannot be automatically completed, sending notice of an incomplete allocation and collecting missing information may be performed directly by the analysis/processing system 108, or may be performed by other systems such as systems 102, 104, 110. The missing information may be collected using alerts/notifications sent directly to a user, presented either within the component systems or through an independent communication platform, such as by text message. One advantage of using an independent communication platform is that multiple hardware types may be supported without needing to adapt the implementation. More active collection methods have the advantage of gathering the information when/where the user is temporally and/or spatially nearer to the events in question.

For example, in the scenario presented above dealing with the $5,000 invoice, the system 100 may automatically send the following message to the number on file for the project manager: "Which chart of accounts option should be used for the new $5,000 invoice from Company X?" This message may be followed by a numbered list of options, with the last number being an option to request more info. The manager may reply with the correct option, and the system 100 may complete the allocation accordingly. If configured to request confirmation, the system 100 may send a follow-up message such as: "The $5,000 invoice from Company X will be allocated to Furniture & Fixtures. Reply with 'change' if this is incorrect."

In cases where the invoice could be assigned to multiple projects, the following message could be automatically sent to a project manager: "A $5,000 invoice just arrived from Company X. Should it be allocated to . . . ," followed by a numbered list of options, with the last number being an option to request more information. Assuming the invoice needs to be allocated to multiple projects, the manager may select an option to split the invoice equally or unequally between multiple projects. In certain embodiments, the system 100 may send a follow-up message such as: "Enter the dollar value or percentage of $5,000 for project XYZ." After receiving a reply, the system 100 may send a final confirmation message. For example, if the reply designated a value less than 100 without a dollar sign or percent symbol, the system 100 may request clarification regarding whether a dollar value or percent value was intended.

Even when allocation is fully automated, any number of the subsystems shown in FIG. 1 may enable automatically-generated results to be displayed and edited and, as noted earlier, the analysis/processing system 108 may be configured to work within the limitations of the component systems to update allocations as needed and use manual input to complete allocations and refine future decisions.

Use of digital assets (e.g., documents, files, etc.) in the file system 106 may be a good indicator of whether an individual or group of individuals has been working on a project. Access to digital assets, such as the time the digital assets are open, changes to the digital assets, frequency of changes, timing of changes, start/end times, or the like may be used to infer (alone or along with other gathered information described herein) work on a particular project and enable the analysis/processing system 108 to automatically allocate the time of individuals or assets, or the use of assets, to particular projects. In certain embodiments, files may include a project code in their names or include other hooks or identifiers to allow the analysis/processing system 108 to determine an amount of time that has been spent on a project. In some embodiments, a database may be maintained that ties particular digital assets to particular projects. Emails, phone calls, text messages, or other communications may also be analyzed in a similar manner to automatically determine or estimate an amount of time or use to allocate to a project.

As described herein, various embodiments of the system 100 are location-aware, meaning that the system 100 may be able to determine the location of people and/or assets in order to automate allocation. This location awareness may be provided by beacon-type hardware within a relatively small geographic area (indoor and outdoor use within a single building or group of buildings). However, the system 100 may also be configured to be more broadly location aware. For example, when mobile or other devices can no longer detect beacon-type signals, for example, the devices may be configured to switch to collecting location information based on cell towers, GPS signals, or the like. The switch may, in certain embodiments, be triggered based on geofence-type rules/measurements. Battery life considerations may reduce the frequency/accuracy of location data collected in this mode, but even with reduced frequency/accuracy the information may nevertheless have great utility for the analysis/processing system 108.

In order to make the system 100 location-aware, a plurality of wireless location beacons may be strategically placed around a facility or area. Each such location beacon may broadcast a universally unique identifier that may be received by other beacons or smart devices, such as smart phones and tablet computers. Such beacons may form at least part of a mesh network wherein some beacons act as gateways to transmit data to and from other devices. The broadcast may also designate a location of the beacon. This location may be programmed into the beacon when placed or may be determined by some other means, such as GPS. Location beacons may be powered by a battery, hard wiring, or energy harvesting, such as solar power. In some embodiments, location beacons may also include integrated sensors, such as accelerometers, thermometers, microphones, light sensors motion sensors, and the like. Readings from such integrated sensors may also be broadcast. Such broadcasted readings may be used to provide input to intelligent appliances or systems such as lighting or HVAC systems.

In some embodiments, location beacons may be placed around a facility or area such that they are spread evenly, cover specific rooms or regions, or monitor entrances and exits. When disposed at an entrance or exit, a location beacon may identify items passing through the entrance or exit and record information such as the date and time associated with the event. Recorded information may be stored locally or transmitted and stored externally. A location beacon may also be connected to an access control system to authenticate persons or objects attempting to gain access to a room or region.

A wireless asset beacon (also referred to herein as a tracking beacon) may be attached to an asset and may periodically scan its vicinity for location beacons. Based on signal strengths from nearby location beacons, an asset beacon may be able to determine which location beacon is closest or coordinate its position via triangulation. In some embodiments, asset beacons may additionally or alternatively determine their location via GPS or inertial sensors.

Some embodiments of asset beacons may comprise audio generation capabilities such as speakers to provide alarms or other audible tones. Such an alarm or tone may be useful when searching for an asset. Other embodiments may comprise visual displays such as LEDs or LCDs capable of providing visual feedback. These embodiments may allow asset beacons to operate as emergency signaling devices based on a variety of sensor inputs including temperature, movement, proximity, and/or environmental factors, such as radiation, gas, or liquid.

Asset beacon broadcasts may be received by other beacons, smart devices, or a mesh network. In some embodiments, asset beacons may comprise an input device, such as a switch, button, or dial, and may broadcast input received to wirelessly indicate progress or completion of a task or control the operation of remote lights or equipment.

A plurality of location beacons and asset beacons may interact together to form a system. Such a system may trigger actions based on movement, location, or proximity of the asset beacons. For example, an alarm function may be triggered if a given asset is moved outside of an authorized area or at all. A work order may be identified as completed when another asset arrives at the end of a production line. A door may be opened or unlocked when a certain asset arrives. An electric timecard may be punched when an employee arrives. Assets may be documented entering or leaving a facility.

The beacons in such a system may be configured with various parameters including signal strength, broadcast frequency, ID, and location parameters. Such a system may be viably implemented using technologies such as Bluetooth-based protocols like iBeacon, RFID, 802.11, and other technologies.

A smart device may be loaded with software capable of supporting and interacting with such a system. For example, a list of location beacons may be stored in software, and the software may recognize a location beacon in proximity to the smart device so that the smart device's location can be determined and send to a server. The software may also send user information to the server to be stored in a database. After a smart device receives confirmation from the server that the information was stored, it may scan for asset beacons, storing their identifiers and self-reported location, signal strength, and transmission power settings. Asset beacon information may then be uploaded to the server. A directory of assets and users may be searched to show the most recent location or a history of locations for tracking purposes. The software may monitor and process data from integrated sensors and may be capable of controlling one or more beacons. The software may be able to provide alerts based on one or more parameters to provide information to a user and/or system. A smart device may use geo-fencing or other triggers to turn scanning on and off based on proximity to a geo-location to save battery life.

Figure 7:
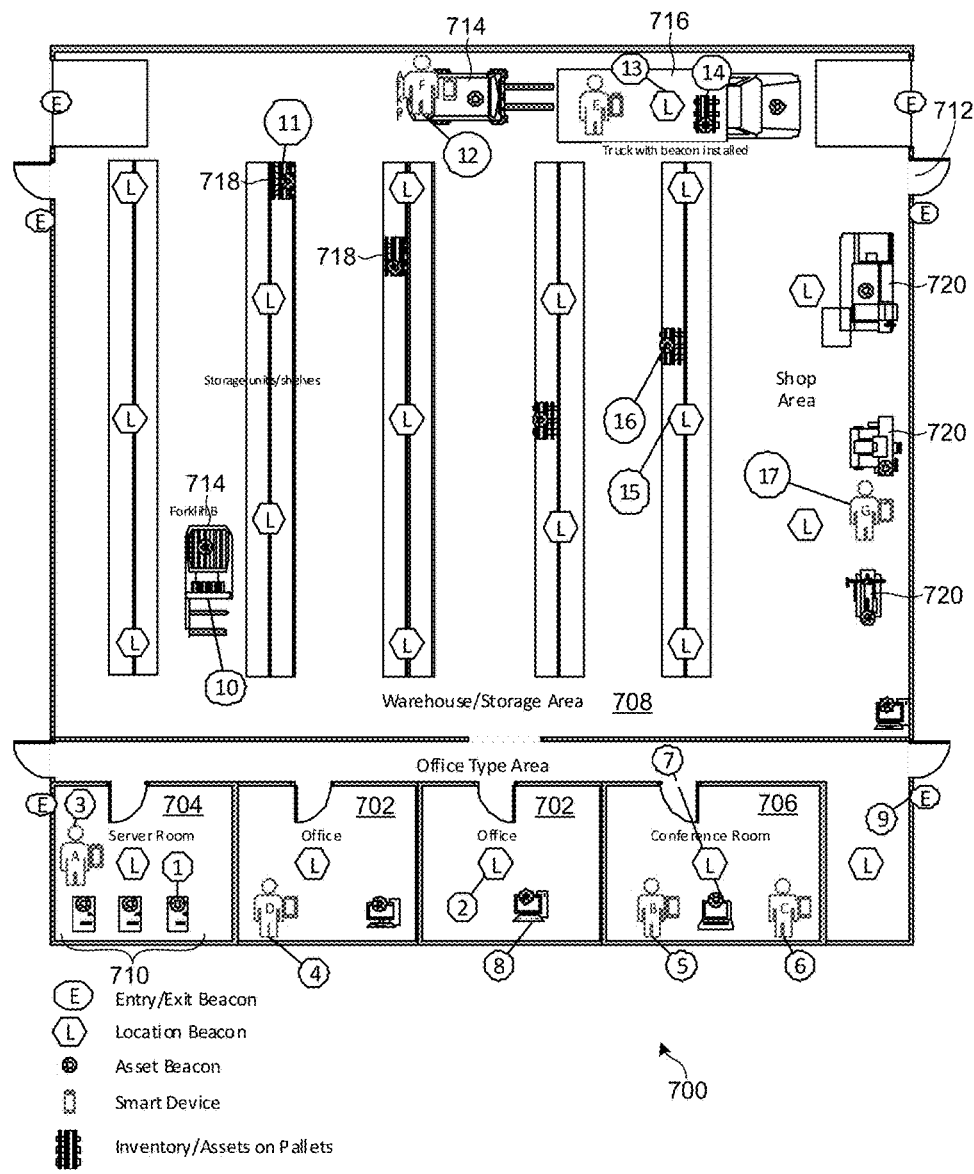
FIG. 7 shows one embodiment of a system of location beacons and asset beacons set up in or around an office building.

FIG. 7 shows one embodiment of a system of location beacons and asset beacons set up in or around an office building 700. In the illustrated embodiment, various different symbols are used to represent entry/exit beacons, location beacons, asset beacons, smart devices, and inventory/assets on pallets or otherwise. As shown, the office building 700 includes office space 702, a server room 704 for IT assets, a conference room 706, and a warehouse/storage area 708.

Data collected by the location beacons and asset beacons may be valuable to a company or organization. For example, groups of individuals that spend too much time together may be identified from the data, and workplace arrangements may be modified to optimize group interactions. Users may be automatically clocked in or out of a time keeping system for payroll or project management based on physical presence or other parameters. As discussed in association with FIGS. 1 through 6, automated systems may automatically associate personnel with one or more assets and/or locations to automatically allocate time and asset usage. If not fully automated, reminders may be added to a timecard timeline to help accurately allocate time based on with whom and where a user was located. Management may observe accurate, consistent data regarding employee locations throughout a day. Locations of personnel and assets may be mapped and displayed in real-time or near real-time on a digital map. Movement of asset beacons and changes in sensor readings on various beacons may be used in analytics systems to monitor behavior, predict future behavior, and/or update a status of one or more assets or processes.

Information from asset beacons may be entered into an asset tracking database, human resource system for employee time and location tracking, a work order and/or inventory management system for tracking inventory assets, and/or a system for allocating machine/asset time and labor time. Such systems may be hosted on one or more servers 710. Location beacons may be installed in rooms 702, 704, 706 and areas 708, and their signal strength may be adjusted to match a size of the room or area and to minimize overlap of signals between adjacent rooms or areas.

In certain embodiments, smart devices may be manually activated or triggered through a geo-location or proximity trigger, after which the smart device may determine a location by scanning for a strongest location beacon. After finding the strongest location beacon, the device may scan for asset beacons disposed proximate thereto, gather unique asset identifications and signal strength information, and send this information to an appropriate system for storage, trending, or analysis.

In certain cases, a person with a smart device may enter or be located in an area hosting a location beacon, as is shown in rooms 702, 704. The smart device may periodically update a system with location information and may also detect assets in a current area or adjacent areas. The updates may be stored in systems for storage, trending or analysis. In other cases, multiple persons, each with a smart device, may be located in a room or area and their smart devices may detect location beacons and asset beacons in the same or adjacent rooms, as shown in the conference room 706. Each person's smart device may also, in certain embodiments, detect other persons' smart devices in the vicinity.

Assets that are movable, such as a laptop computer, may be able to be moved to various rooms/areas in a facility 700. A location of the assets may be determined as people with smart devices move through the facility and periodically capture location and nearby asset signals. In certain embodiments, an asset tracking system may be capable of analyzing and algorithmically estimating a location of one or more assets based on a triangulation of signal strength and location from various smart device records. Signal records with strength values may be used to calculate a location of an asset.

A location beacon at an entry 712 or exit 712 may detect one or more smart devices, through proximity or another trigger, to document an asset entry into or exit from an area 708. Additionally, the smart devices may be configured to transmit entry or exit signals for access control systems instead of using a keypad, proximity card, or other system to grant or deny access.

In certain embodiments, forklifts 714, trucks 716, and other vehicles may be equipped with an asset beacon, and the asset beacon's position may be derived from signals gathered by one or more location beacons. Similarly, pallets 718, boxes, or other storage apparatus or containers may be tagged with asset beacons and stored in various locations.

A person driving a forklift 714 may have a smart device carried on his body or attached to his vehicle to gather information as he moves through the facility 700. As the forklift 714 moves through an area 708, location information may be derived by scanning for location beacons and triangulating a location. Asset beacons having sufficient signal strength may be detected and recorded. Additional records of position and beacon signal strength may allow the location of assets to be triangulated with a high degree of accuracy.

In certain embodiments, trucks 716, trailers, railcars, containers, and storage areas may be equipped with location beacons as well as asset beacons. A person with a smart device may detect one or more assets including trucks and trailers, and the person may document the contents of the vehicle as items are loaded or unloaded. Sensors may be installed to capture asset data as a truck or other vehicle passes by the sensors. An asset within a vehicle or container may be associated with the vehicle or container.

In a storage or warehouse area 708, location beacons may be arranged in a pattern that may facilitate a triangulation of position based on the strength of a signal of one or more of the beacons. The location beacons may capture a signal of one or more asset beacons and algorithmically determine a location of the one or more asset beacons based on signal strength and a multiplicity of scan events. In certain embodiments, location beacons may be arranged vertically as well as horizontally in order to effectively locate assets in a vertical as well as a horizontal plane. For example, locations of pallets or boxes may be determined in both vertical positions on a shelving unit as well as in a horizontal plane.

In certain cases, a person with a smart device may perform maintenance on an asset, such as a shop machine 720 or air conditioning unit. One or more asset beacons may be scanned to identify the asset. The asset's location may be verified via reference to one or more location beacons, and asset information, associated maintenance information, or other information may be stored in appropriate systems. In certain embodiments, an asset beacon may include a passive device for establishing location and proximity. The asset beacon may also include functionality for collecting data, such as run time and/or hours of service, etc. This may be accomplished by use of an accelerometer, current monitor, on/off switch, or other mechanism for collecting usage, duration, or service information.

In certain cases, a person may perform manufacturing work using a machine having an asset beacon associated therewith. Work may be performed on a work order, work instructions, an electronic device—such as a tablet—for displaying work information, a parts container or caddy comprising raw materials or other components, or the like. The system may log and/or store a location of a user, a work order, an asset, or a combination thereof, and convey information to a server 710 based on proximity for allocation of asset time and costs, labor time and costs, materials consumption, work order progress, and the like.

Figure 8:
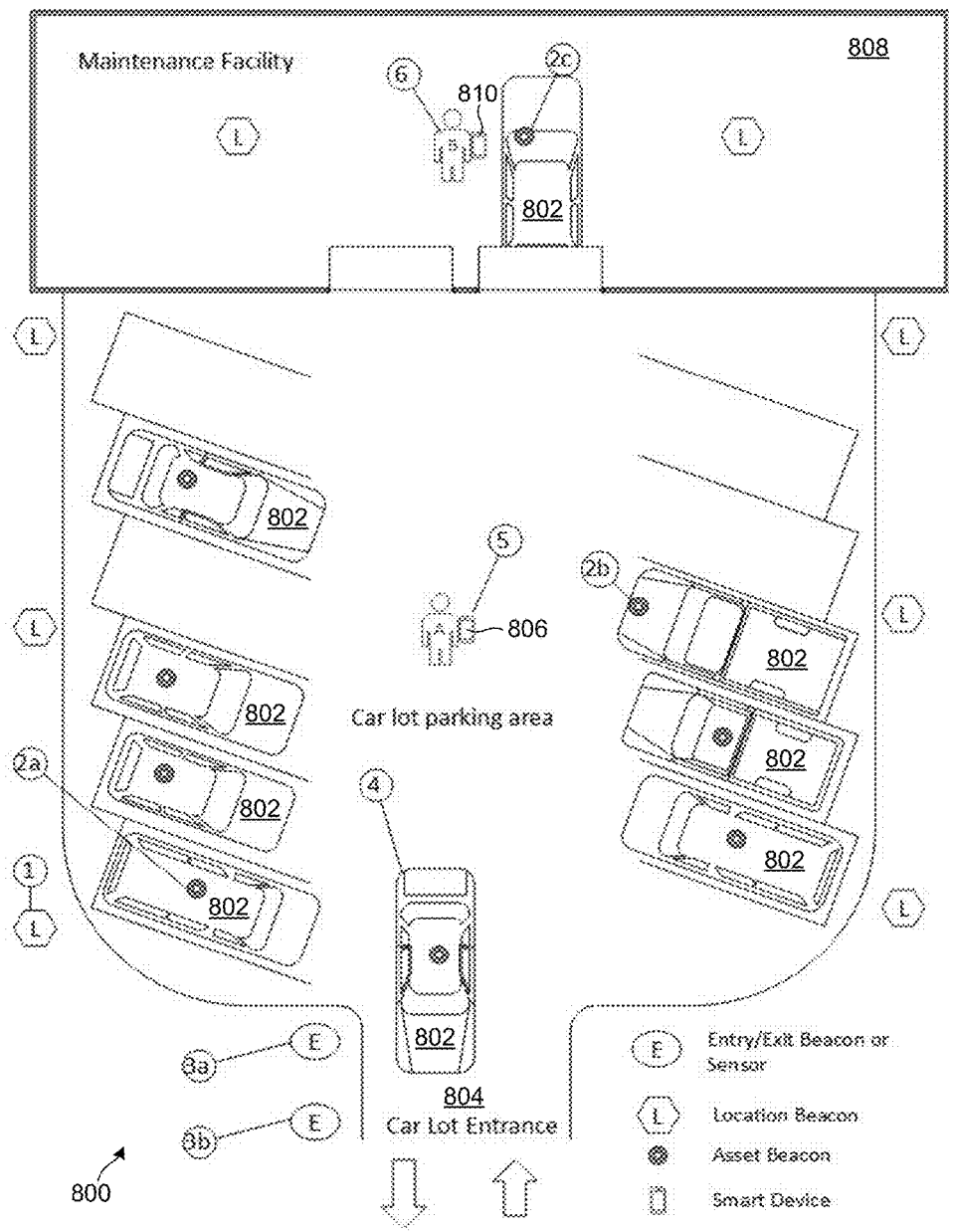
FIG. 8 shows one embodiment of a system of location beacons and asset beacons set up in or around a car dealership.

FIG. 8 shows one embodiment of a system of location beacons and asset beacons set up in or around a car dealership 800 containing one or more automobiles 802. In this embodiment, mobile assets, such as automobiles 802, may be equipped with asset beacons and entrances and exits to the car dealership 800 may be equipped with location beacons. By placing several location beacons sequentially at each entrance 804 or exit 804, a direction of travel of the asset may optionally be determined and recorded. In certain embodiments, a smart device 806 may be moved through the car dealership 800 to detect asset beacons so that they may be recorded. In such embodiments, the system may reconcile present assets with previously recorded assets and report any issues, such as missing assets.

In the illustrated embodiment, asset beacons may be designed so that they are temporarily and removably attached to an automobile. For example, a magnet may be used to attach an asset beacon to an exterior, interior, or undercarriage of an automobile 802, or temporary adhesive may be used to adhere the asset beacon under a dash or to some other part of an automobile 802. In certain embodiments, an asset beacon may be attached to an accessory fuse location in an automobile 802. Alternatively, a temporary beacon may be attached to a key chain or placed on an automobile dashboard.

In one embodiment, a person with a smart device 806 may pass through a car dealership 800 and his location may be triangulated based on wireless signals from one or more location beacons. Asset beacons, their respective signal strengths, and their relative locations, may be recorded and stored. In certain embodiments, the smart device 806 may be configured to identify an asset and collect management data, such as work performed on the asset.

Asset beacons may be configured to simply report ID information, or report more complex information. In certain embodiments, asset beacons may be configured to report information gathered from sensors, such as a GPS sensors, temperatures sensors, pressure sensors, accelerometers, vibration or movement sensors, light sensors, audio sensors, radiation, or the like. This information may be used to calculate and/or record an average speed, acceleration, deceleration, impacts, or other information for service or management of assets.

In certain embodiments, when an automobile 802 is admitted to a maintenance facility 808 of a car dealership 800, an asset beacon may be placed on the automobile 802. This asset beacon may associate the automobile with a customer and automobile maintenance record. When a mechanic performs services on the automobile 802, parts used and time spent may be collected using a smart device 810 linked to the asset beacon by proximity or manual selection. In other embodiments, the asset beacon itself may incorporate buttons, a touchscreen, or other input elements to enable information (e.g., maintenance information, etc.) to be input and stored for the automobile 802. This information may be stored locally on the asset beacon and/or communicated to a remote device or server.

Figure 9:
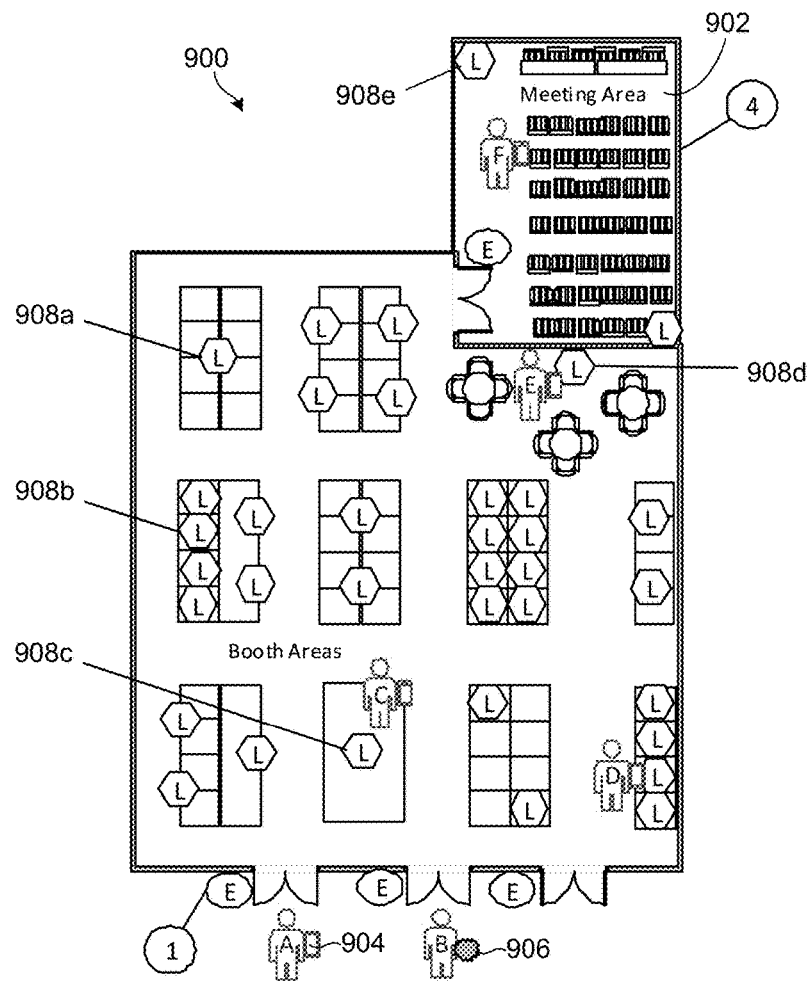
FIG. 9 shows one embodiment of a system of location beacons and asset beacons set up in or around a convention or trade show facility.

FIG. 9 shows one embodiment of a system of location beacons and asset beacons set up in or around a convention or trade show facility 900. Location beacons may be placed at major checkpoints around the facility 900 such as at display booths, meeting rooms 902, auditoriums, and gathering areas. Convention or trade show participants may be issued an asset beacon that they may wear or carry. The system may monitor the entry and exit of participants and gather other information about participant movement in and around the facility 900. This may be used to determine human traffic flow patterns, booth visits, duration of visits, activities or seminars attended, distribute information or materials to participants via proximity triggers, collect feedback based on location, or the like.

In certain embodiments, such a system may interact with other systems such as asset tracking databases, human resource systems for employee time and location tracking, contact management systems, document storage and dissemination systems, or person-to-person messaging systems. Location beacons may provide entry/exit information to a person with a smart device 904 that may store that information locally or on a central system. The smart device 904 may also activate specific functions, such as a map with a location depiction, booth locator, person locator, seminar locator, reminders, and the like. Location and asset beacons may monitor a passage of a smart device or a wearable companion beacon 906.

Location beacons may be strategically placed to provide location awareness or additional functionality. These location beacons may use varying densities and transmission power settings, and also a location within a matrix to provide general area or very specific location information. The location beacon 908a is a location beacon for monitoring a general area. The location beacons 908b are used for gathering information, such as visit durations, flow of participants, or the like. The location beacon 908c represents a location beacon assigned to a larger booth. Location beacons may gather and store data from one or more smart devices or from one or more other beacons. Information from the booths may also be presented to one or more smart devices for advertising, informational, or other purposes. Smart devices and related software may use location beacon information for establishing current location, provide search and direction capabilities to find a vendor or product, or can be used to map and collect data on the person's path through the area including duration of visits to specific areas, data accessed from the area, etc., to a central system for data mining and marketing analysis.

In certain embodiments, location beacons such as the location beacon 908d may be used with one or more smart devices to help find people in an area, find others with similar interests, establish current locations, provide a map for locating people or meetings, and/or provide announcements regarding activities, offers, or the like. Location beacons such as the location beacon 908e may be used to document meeting attendance, collect feedback for presenters, provide voting and preferences input from attendees, provide for automated drawing and giveaway programs, and to collect attendee information for entry into billing, customer management, and other types of systems. In certain cases, a person may manage contact with a vendor in a booth using a smart device to request information, enter drawings, and/or participate in interactive services.

Figure 10:
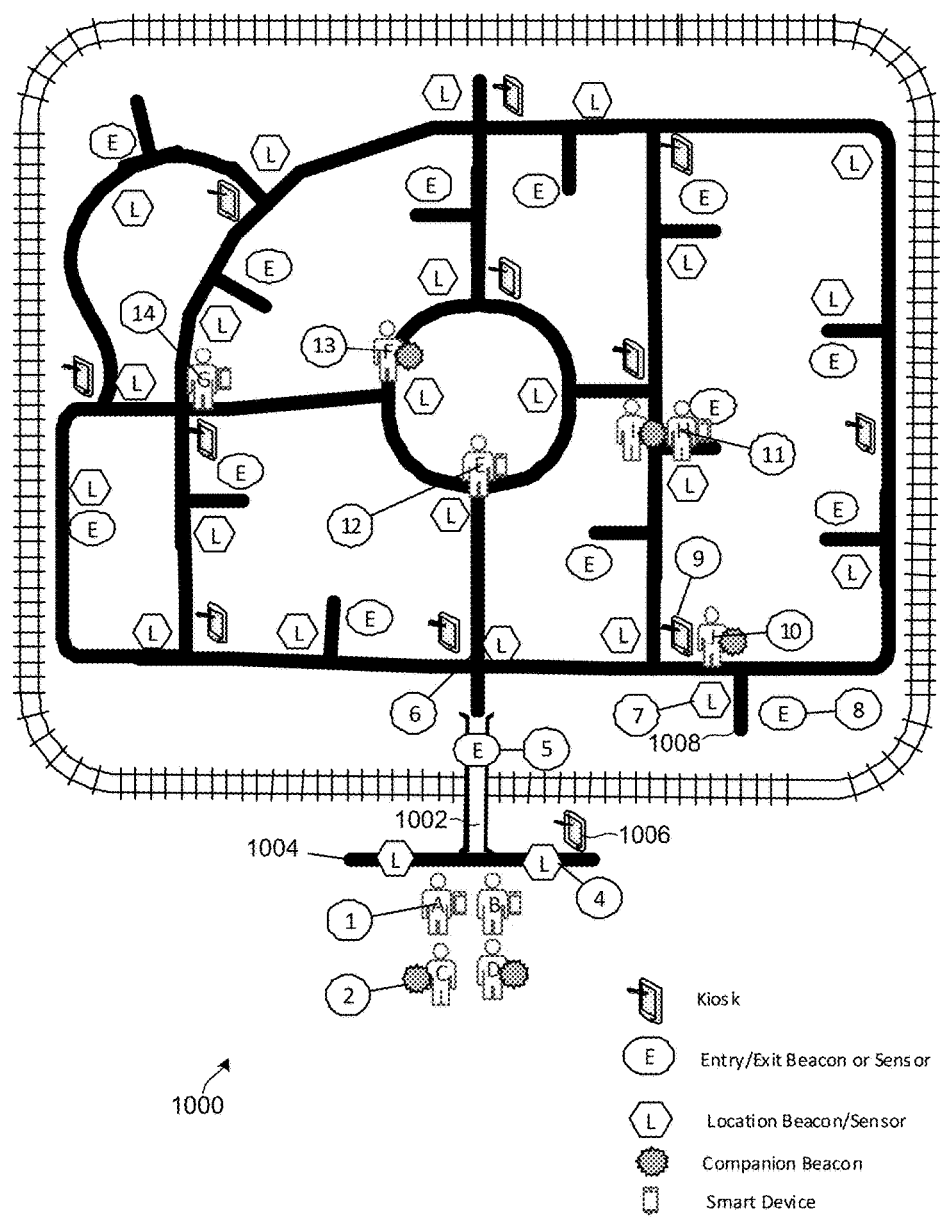
FIG. 10 shows one embodiment of a system of location beacons and asset beacons set up at an amusement park.

FIG. 10 shows one embodiment of a system of location beacons and asset beacons set up at an amusement park 1000. Location beacons may be placed at major checkpoints around the amusement park 1000 such as at entrances 1002, rides, shops, restaurants, stages and other activity areas. Guests to the amusement park 1000 may be issued an asset beacon that they may wear or carry. The system may track the guests to gather information, such as entry or exit of guests, location of guests, wait times, and queue lengths. Based on this information, suggestions may be made to the guests as to where shorter wait times or queue lengths may be found. In certain embodiments, alerts may be sent to a parent or responsible individual when a child has wandered too far away from him or her. Signs may be adjusted to provide individual messages to specific guests such as where to find their friends or relatives.

In operation, guests may receive and/or register one or more asset beacons or smart devices with the system before entering the amusement park 1000. In certain embodiments, an entry area 1004 may provide services, such as wireless connectivity and support for software installation and associated services via kiosks 1006. The entry area 1004 may also provide location services via one or more location beacons. Location beacons may log entry into or out of an area. Location beacons may also provide location information to smart devices which may be logged into systems for providing services, such as person-to-person messaging, finder services, and mapping services. Additional services may be provided based on a user's location within the amusement park 1000.

In certain embodiments, location beacons may be disposed at or near an entrance 1008 of a ride/amusement queue, and may be used to validate admission to the area, monitor a number of guests in line, track waiting times, suggest nearby activities or restaurants, and the like. The location beacons may also be used to provide priority access or other perks.

Strategically placed kiosks may allow for various software services. These software services may include aid for finding other members of a party, messaging, or "meet me" types of notifications. The strategically placed kiosks may also provide services for finding areas and amusements and finding shortest queues. A person may be identified by the kiosk via a smart device or asset beacon.

Both asset beacons and/or smart devices may be usable for admission systems and prioritization in queues, as well as providing services for locating individuals. A combination of at least two smart devices and/or asset beacons may be used for maintaining contact with other party members. For example, as a child with an asset beacon moves away from a parent, an alarm may notify the parent and one or more location beacons may relay proximity data of the child's asset beacon to a smart device so the parent can locate and reunite with the child. The asset beacon may also be used at an exit to alert a parent and/or staff if a child wearing the asset beacon leaves an area without a parent device in close proximity thereto. In certain embodiments, a party member may send and receive messages with other members of party via a smart device or kiosk.

Figure 11:
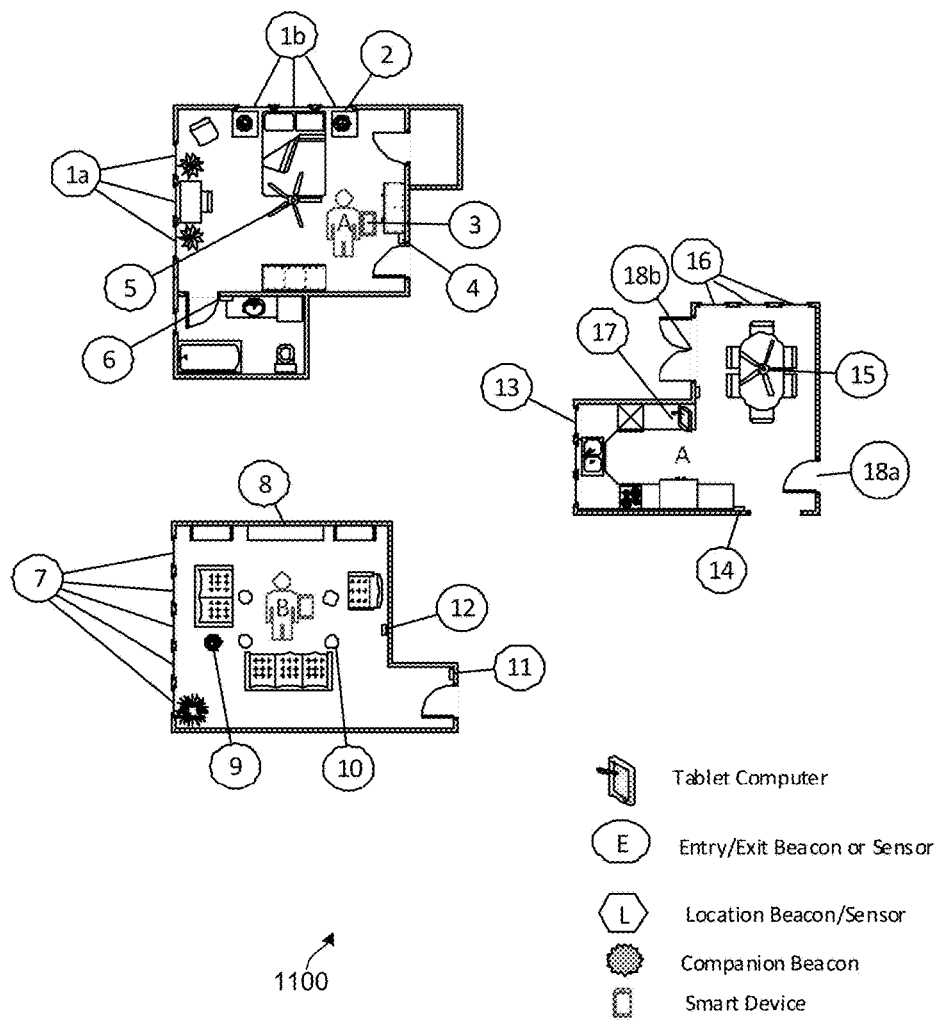
FIG. 11 shows one embodiment of a system of location beacons and asset beacons set up at a residential home.

FIG. 11 shows one embodiment of a system of location beacons and asset beacons set up at a residential home 1100, such as a single-family dwelling, multi-family dwelling, or apartment. Such a system may aid in determining the location of objects within the home 1100, controlling appliances in the home 1100, monitoring environmental conditions in the home 1100, authorizing and/or denying entry to the home 1100, and the like.

Asset beacons may be placed on or attached to various objects of interest or value in or near the home 1100. Such assets may include, for example, keys, remote controls for electronics, electronic devices (e.g., phones, tablets, laptops, computers, televisions, cameras, video equipment, audio equipment, etc.), briefcases or luggage, artwork, valuable or keepsake items, furniture, tools, vehicles or equipment stored at or near the home 1100, and the like. These asset beacons may allow a user to track the location of the objects in or around the home. Location beacons may be strategically placed in or around the home 1100 to detect the asset beacons as well as provide other features and functions. In certain embodiments, off-site tracking functionality, such as GPS sensors, may be incorporated into the asset beacons to enable the associated assets to be tracked when away from the home 1100.

In certain embodiments, asset beacons may be configured to emit an alarm or sound tone to aid in locating assets. Such an alarm or sound may, in certain embodiments, be activated for all assets or only for select assets. The asset beacons may, in certain embodiments, be configured to receive remote commands or activation signals to activate such alarms or sounds.

In certain embodiments, asset beacons may provide a gateway to control various devices or appliances throughout a home 1100, either individually or collectively. For example, motorized window blinds or other window coverings may be equipped with asset beacons that may also function as gateways to remotely control or program the window blinds. Other appliances or devices within a home 1100 may be remotely controlled or programmed in a similar manner. Similarly, asset beacons may incorporate sensors (e.g., temperature sensors, pressure sensors, light sensors, accelerometers, motion sensors, etc.) to gather various types of data throughout a home 1100. This data may, in certain embodiments, be used by home automation systems or other control systems to control other devices (e.g., HVAC systems, lighting, fans, automated window coverings, door/window locks, etc.) in the home 1100.

Location beacons placed throughout the home 1100 may, in addition to being used to locate asset beacons, be used to control other devices or appliances, or be used to gather various types of data. For example, location beacons may incorporate buttons, touchscreens, or other input elements to enable a user to control other devices or appliances, either by way of asset beacons or directly using various home automation protocols. Using these input elements, the location beacons may be used to turn various devices on or off, adjust a parameter (e.g., speed, temperature, intensity, etc.) associated with a device, toggle between different devices or functions, or the like. Location beacons may also be used to relay programming, control signals, and/or data between devices (e.g., smart devices, computers, etc.) and asset beacons or other devices. Thus, the location beacons may provide a mesh network for relaying information.

Referring generally to FIGS. 12A through 16, how asset beacons and location beacons are implemented in hardware may vary in different embodiments. As explained above, asset beacons and location beacons may use a variety of different communication protocols, including Bluetooth-based protocols such as iBeacon, RFID, 802.11, and other technologies. The protocol selected may be based on a desired communication range, power usage, reliability, and the like.

The manner in which asset beacons and location beacons are powered may vary in different embodiments. Beacons may, in certain embodiments, be powered by a small rechargeable battery or capacitor. Stationary beacons, such as location beacons, may be hardwired into existing electrical systems to increase reliability and reduce the need for low power electronics. A battery backup may be provided in stationary implementations if needed or desired. In certain embodiments, a solar cell or other energy harvesting technology may be used to maintain a battery charge and reduce or eliminate the possibility of a discharged battery that renders the device inoperative. Advanced use of solar or other ambient energy harvesting such as radio frequency energy collection may reduce or minimize the potential for data loss or system control issues due to discharged batteries. It may also allow for smaller batteries or even the elimination of batteries and use of capacitors to level energy harvesting fluctuations. Solar cells with logic, sensor, and radio components integrated via a laminated printed circuit board (PCB), or adhesively mounted to form a lightweight and very thin profile, can be weather proofed and integrated into a variety of platforms.

In other embodiments, asset beacons and location beacons may be powered using insulated, spring-closed, clips/clamps with ferrite components to enable easy installation to a light switch or electrical plug by clamping around the neutral and common wires, over their insulation. Such an embodiment allows for charging of an onboard battery whenever the switch is on or a device is plugged into an outlet and used which causes electrical current to pass through the clamps.

Various sensors may be incorporated into a beacon's circuit board. These sensors may be used to automate local functions or may be relayed to a smart device/application or a central system for monitoring, trending, and control functions. For example, temperature sensors may be used to control environmental systems locally in an automated system, and/or provide override capabilities in a local or centralized system. Ambient light sensors may be used to control lighting fixtures or circuits, automated window covering systems, and the like. Motion may be detected using accelerometers, gyroscopes, or other sensors to detect movement including vibration. A timer/clock may be incorporated into the beacons to activate/deactivate processes or devices based on time of day, elapsed time, or a preconfigured schedule. Electrical current sensors may be used to determine power consumption, power density, measure start and stop times of activity, total run time, and the like.

Proximity sensors may be used to detect other beacons or radio frequency sources, light of a specific frequency or brightness, magnetic fields, or other objects or energy sources that are in close proximity to a beacon. Touch sensors such as physical buttons, capacitive touch sensors, or other types of touch sensors may be used to activate features, acknowledge inputs, and the like. Longer touch sensors built into the edge of a solar cell or front of a beacon device may be used to provide sliding functions to increase/decrease a parameter. Pressure sensors may be used to detect pressure changes due to weather, detect movement via localized pressure changes, detect opening of doors/windows, or the like. Audio sensors may be used to detect the breakage of doors/windows, and/or recognize voice or sound patterns. Optical sensors may be used to recognize patterns in order to sense gestures, facial or other features, barcodes, or additional visible or invisible optically recognizable features. GPS sensors may be used to acquire and record location information from Global Positioning System satellite signals. Chemical sensors may be used to monitor/detect presence or change in environmental chemicals such as carbon monoxide, smoke, radioactive particles, dust, and the like.

In certain embodiments, a speaker with a tone generator or other output to acknowledge button presses or other actions may be included in a beacon to provide feedback either through audible sound or vibration. This can be used in a "find-me" mode where the beacon emits a tone to assist in locating the beacon and the asset that it is attached to. In other or the same embodiments, small LEDs or other light-emitting devices may be included to provide feedback in place of or to supplement audio tones or vibration. Additionally, it is also contemplated that a LCD, LED or other display may be used to provide interactive menus for a beacon in certain embodiments.

Input to the beacon may be provided by various buttons or touch sensors and various input codes may be used to activate specific functions. These may include, but are not limited to, quick touch, longer touch, sequential touches, code of touch such as pressing two buttons in a specific sequence such as AABA, AABB, or ABAB etc. to activate various functions and responses to the system. Buttons may be arranged and mounted in a variety of ways according to the purpose of the device. These buttons may be used for item selection, Yes/No, plus/minus, increase/decrease, on/off, acknowledge/cancel, and/or the like. Buttons may be mounted on the front of the device for direct press or the device itself may be mounted on a one, two, or three-dimensional rocker mount that allows for pressing of the device. This may activate one or more buttons by pressing the button against the mounting surface, as will be discussed in association with FIGS. 14A through 14C. Return to a neutral position may be accomplished via a variety of elastic or springy materials such as metal or plastic springs, springy foam materials, or the like.

Beacons may be as simple as a device that periodically transmits an identification data stream at a predetermined signal strength and frequency which can be used to identify and track an asset or establish the location of an asset or person. Additional functionality such as the inclusion of sensors enables tracking of variables such as environmental factors like temperature or movement of the asset and allow for the device to take actions such as sounding an alarm tone or flashing an LED strobe to more advanced actions such as collecting and transmitting data to a smart device/app or centralized system for monitoring, trending, and decision making. Each type of beacon, whether it be an asset beacon or location beacon, may function as a tracking beacon to determine the location of assets or people or for marking a location that can be referenced for the calculation of position.

The addition of input functionality allows for the control of systems and devices as well as the collection of inputs for local action by the device or the transmission of this data to other systems for monitoring, trending, and decision making. Local actions may include dimming lights and turning them on or off depending on the sunlight entering the room or signaling air conditioning system to raise or lower temperature in the area or provide an override via the button actuation to turn devices on or off and adjust levels. More advanced systems may utilize sensors and manual inputs to gather data centrally to initiate maintenance based on run time, vibration, and other sensor inputs such as fluid or air contamination to indicate danger or need for maintenance. Additionally, process type systems can use sensor data such as proximity to other beacons to relate work data and progress of work. This may be used by a manufacturing system to associate a work order traveler beacon to an operator with a smart device/app with beacon functions, working on a machine with an asset beacon. This may allow the system to allocate machine usage time, labor hours, and related data in that system with no manual intervention.

In certain embodiments, a mobile asset beacon may be implemented using a single circuit board engineered to contain all system components. A high efficiency solar cell may, in certain embodiments, be manufactured directly onto the back of the circuit board. This solar cell may be configured to capture light from near infrared to near ultraviolet. Printed circuit board traces may be built into the side opposite the solar cell to support a Bluetooth chip, rechargeable battery, and supporting components.

A case may be lower-pressure injection over-molded onto the circuit board to completely water proof system components. In certain embodiments, magnets may be included in the back of the case to allow for quick attachment of the beacon to other components. Alternatively, or additionally, clamps, clips, or a strap may be attached to the case for attaching the beacon to assets, people, or the like.

As previously mentioned, the beacons may use Bluetooth, and more particularly Bluetooth Low Energy (LE), as the communication technology. This technology enables concurrent peripheral and broadcaster roles. This technology can also advertise iBeacon or other data while concurrently scanning for its current location and storing the last known location, then adding the information to the advertising packet. The firmware is wirelessly updateable, and iBeacon or other system parameters (e.g., proximity UUID, major, minor, transmission strength, transmission interval, identifier, etc.) may be updated from a smart phone application. Bluetooth or other wireless technology may wirelessly transmit data through a mesh network to a gateway on another type of network, such as Ethernet, for use in centralized systems.

Figure 12A:
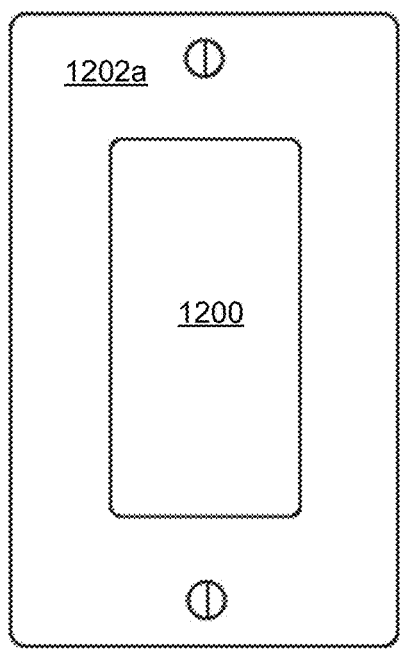
FIG. 12A shows one embodiment of location beacon mounted in a standard, rocker light switch cover.
Figure 12B:
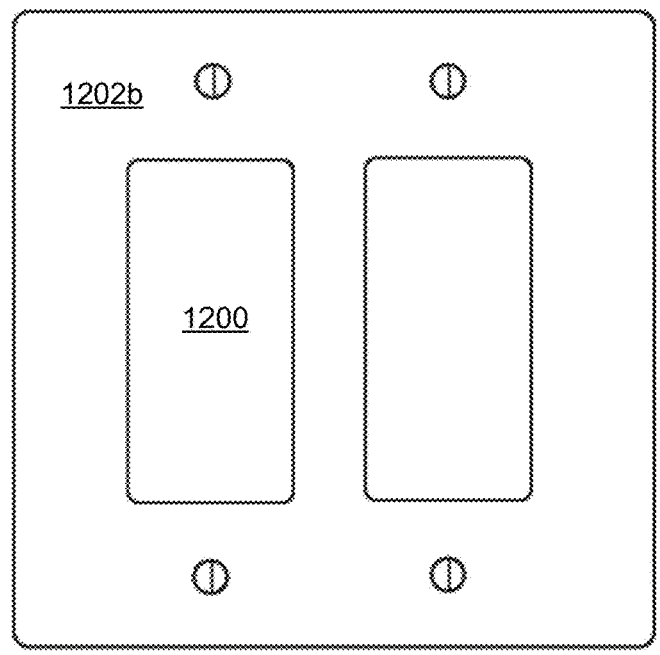
FIG. 12B shows one embodiment of a location beacon mounted in a dual-gang rocker light switch cover.

FIG. 12A shows one embodiment of location beacon 1200 mounted in a standard rocker light switch cover 1202*a*. The center switch portion is a beacon device 1200 with an integrated solar cell facing outward and electronics and switch features hidden behind a cover. The external dimensions are designed such that it allows for integration of a standard rocker-type switch cover 1202*a* that is attached directly to a surface such as a wall with no alteration or holes other than the face plate mounting holes. The beacon may be attached to a wall or surface by covering the beacon with the wall plate and attaching the wall plate to the wall or surface. In certain cases, a beacon 1200 may be added to a current wall-mounted electrical switch location by adding the beacon 1200 device to one side and changing to a dual gang or larger panel cover 1202*b* and mounting the beacon device 1200 or devices in the additional opening(s), as shown in FIG. 12B.

Figure 13:
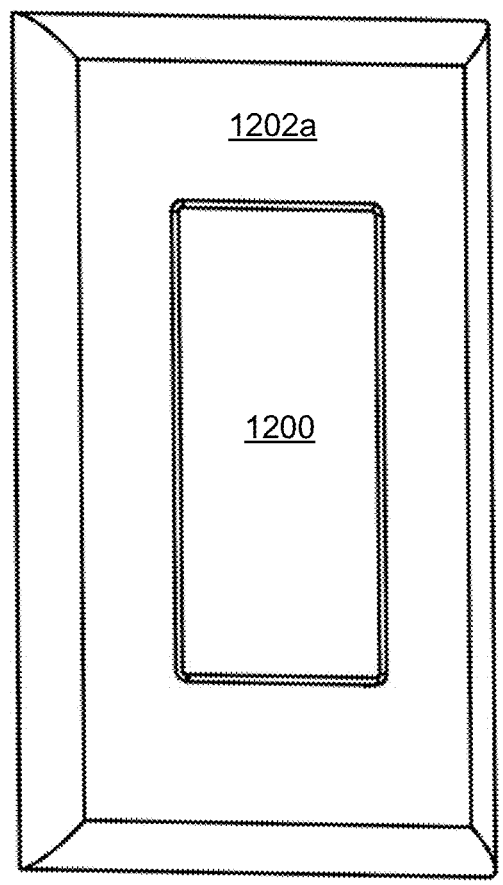
FIG. 13 shows a beacon device in a wall plate that is affixed to a wall with standard screws or other mounting systems.
Figure 14A:
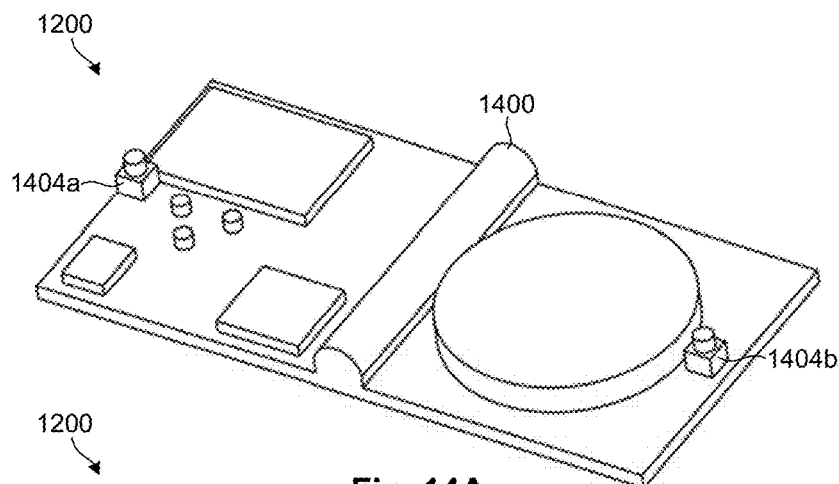
FIG. 14A shows one embodiment of a beacon device that pivots along a center ridge held against a wall.
Figure 14B:
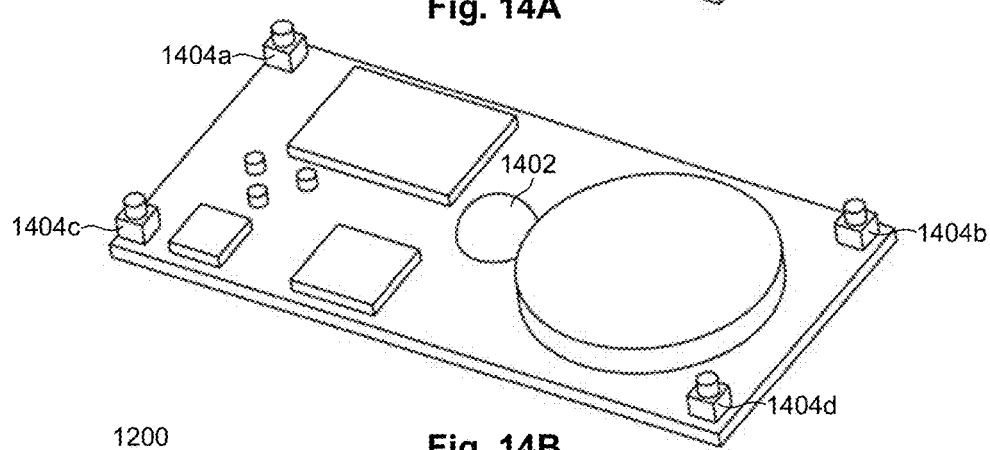
FIGS. 14B and 14C show embodiments of a beacon device that pivot around a partial spherical feature held against a wall.
Figure 14C:
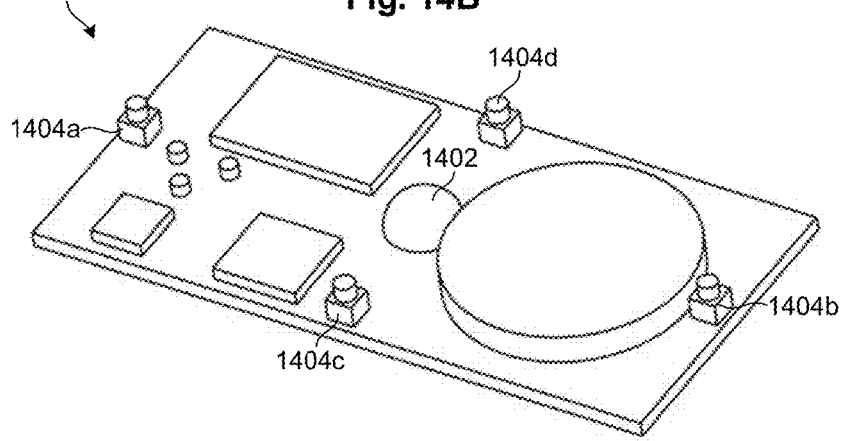

FIGS. 13 and 14A-C show a beacon device 1200 configured to fit in a standard, rocker light switch cover 1202*a*. As shown in FIG. 13, the beacon device 1200 fits into that opening and the wall plate 1202*a* is affixed to the wall with standard screw or other mounting systems. FIGS. 14A-C show various embodiments of the back of a beacon device 1200, which is held against a wall by a wall plate 1202. FIG. 14A shows one embodiment of a beacon device 1200 that pivots along a center ridge 1400 held against a wall. FIGS. 14B and 14C show embodiments of a beacon device 1200 that pivot around a partial spherical feature 1402 held against a wall.

In the embodiment of FIG. 14A, pressing either end of the device will actuate a switch 1404*a*, 1404*b* on the respective end. The switch 1404*a*, 1404*b* may be spring loaded with an elastic material to cause it to return a neutral position after being pressed. This type of input operation will work with one, two, three, four or more switches 1404 arranged in appropriate locations around a fulcrum type of feature. FIG. 14B shows a configuration having switches 1404*a-d* in the corners and a partial sphere feature 1402 that allows the device to pivot around its center. Pressing a corner will actuate the switch 1404 under the corner. Pressing an edge will actuate two corner switches 1404 simultaneously, enabling additional types of inputs or selections. FIG. 14C shows a configuration having switches 1404*a-d* located on the edges of the device 1200. Pressing an edge will actuate the switch 1404 under the edge. Pressing a corner will actuate two edge switches 1404 simultaneously, enabling additional types of inputs or selections.

The beacon devices 1200 shown in FIGS. 14A through 14C may be used as either asset beacons or location beacons, either in stationary or mobile applications. The ability to use a beacon 1200 as an input device allows the beacon to be used in a wide variety of different applications. For example, the inputs on the beacon may be used to control a wide variety of different devices. In one contemplated embodiment, the beacon device enables a large number of different devices (e.g., window blinds or groups of window blinds, lights, fans, heating systems, cooling systems, etc.) to be controlled without requiring separate controls for each device or system. For example, using the directional switches 1404 illustrated in FIG. 14C, actuating the switches 1404 on the sides of the device 1200 may be used to select a device or system to control, whereas actuating the top and bottom switches 1404 may be used to adjust an amount associated with the device or system. Specifically, actuating the switches 1404 on the sides of the device 1200 enables a user to select a current function for the beacon device 1200. A set of indicators (e.g., colored LEDs, LEDs with accompanying pictures or icons, etc.) may optionally be provided to indicate the current function of the beacon device 1200. Actuating the switches 1404 on the top/bottom of the device 1200 enables the user to increase or decrease an amount associated with the current function.

In other applications, the beacon device 1200 may be used to input information associated with an asset. For example, if the beacon is attached to or travelling with an asset, a user may input information to indicate a status of the asset. For example, a button press or combination of button presses may be used to indicate that certain tasks (e.g., maintenance tasks, manufacturing tasks, service tasks, etc.) have been completed or are being performed on an asset. This allows the asset's status, in addition to its location, to be tracked from a remote or centralized location. Such an embodiment would allow, for example, the status of a work order to be tracked as it passes from station to station within a factory. Other applications are also possible and within the scope of the invention.

Figure 15A:
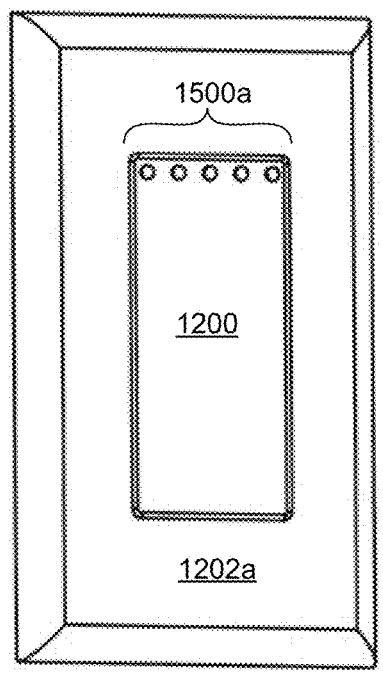
FIGS. 15A and 15B show location beacons configured to provide visual feedback via an LED or set of LEDs, or a display such as a single, multi-line, or graphical LCD.
Figure 15B:
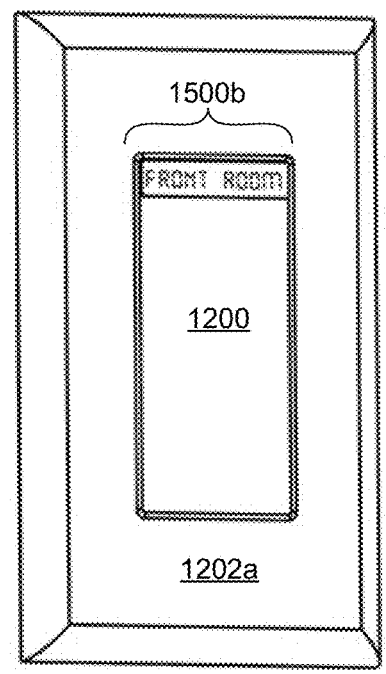

FIGS. 15A and 15B show location beacons 1200 configured to provide visual feedback via an LED 1500a or set of LEDs 1500a, or a display 1500b such as a single, multi-line, or graphical LCD 1500b. The LEDs 1500a may be single or multi-color and may be used to indicate item selected, indicate a level such as temperature level for an air conditioner control, or light level for a dimmer function. This may be displayed as turning on/off discrete LEDs as the level changes or changing the color of the LEDs such as from red to blue as cooler temperature is selected through activation of the switching functions by pressing the corners or quadrants of the device. The remainder of the face of the device 1200 may be a solar cell used to charge and maintain the operating power requirements of the device. Lights 1500a or displays 1500b may be arranged as desired for functions around edges of the device to provide data/feedback on selection and status of selected functions.

Figure 16:
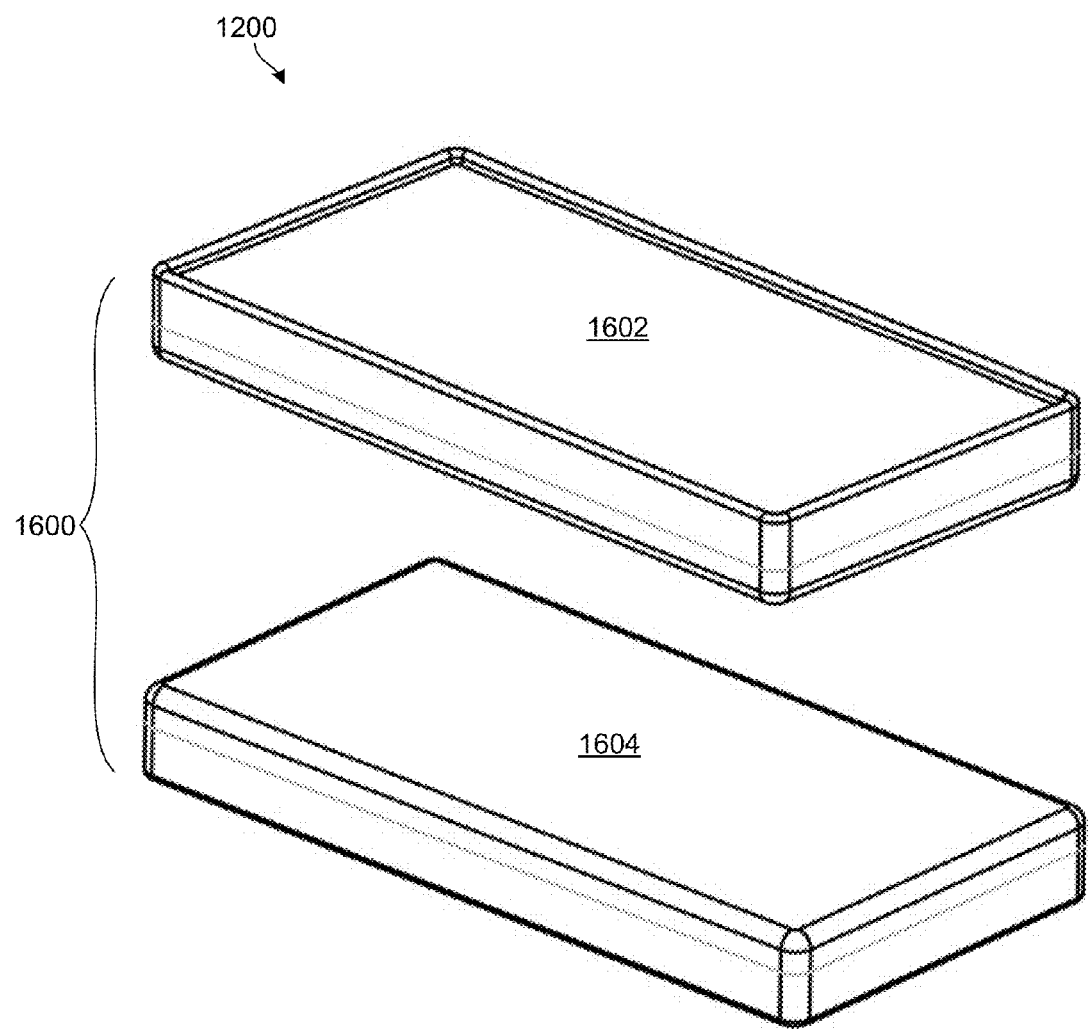
FIG. 16 shows one embodiment of a beacon configured to be attached to an asset.

FIG. 16 shows one embodiment of a beacon 1200 configured to be attached to an asset. Such a beacon 1200 may be used, for example, to track a process such as a work order in a manufacturing environment. FIG. 16 shows a top 1602 of the device 1200 with the solar cell enclosed in the case 1600. FIG. 16 also shows a back 1604 of the case 1600 that can be manufactured with multiple types of mounting methods. A magnet may be molded internally into the case 1600 for magnetic attachment to a machine or other asset. A clip, bracket, or other attachment device may be built into the device 1200 or attached with adhesive or screws to provide for a variety of mounting options. An adhesive such as double-sided tape or an epoxy or glue may be used to provide a more permanent bond to an asset or location such as a ceiling grid, door jamb, wall, vehicle, or the like.

Beacons such as that shown in FIG. 16 may be equipped with various sensors and may be employed in asset management systems where beacons transmit ID values and a signal strength value. A smart device/application or other more advanced beacon device may evaluate, record, and transmit data as needed for locating and tracking assets and/or people. This may be used to manage labor time and/or asset usage, or may allow health and safety systems to quickly locate people or a document's last known location. Advanced beacons with sensors may monitor and trigger local actions as well as trigger actions in centralized systems through detection of hazardous conditions or based on specific stimuli.

As previously mentioned herein, processes in current business systems that occur before and after the allocation processes described above are both manual and automatic in nature. Where manual input is required, these processes are frequently delayed and more urgent or more interesting work pushes the mundane review and approval tasks lower on the priority list. Even when clear deadlines are in place, processes are usually so rigidly defined that bottlenecks are avoided only when extra resources/personnel are dedicated exclusively to the mundane work. And even with dedicated resources/personnel, manual tasks are not always completed on time, and bottlenecks arise that impact many or all system processes/users. These are often resolved only when stakeholders with sufficient administration privileges take care of the work that others have neglected.

A related shortcoming of many current systems is the large timeframe required for collecting and processing information. Larger (longer duration) payment and billing cycles, for example, are needed in current systems because shorter cycles may exacerbate the problems just described, but these larger cycles are inherently limiting—they limit/delay awareness of issues, they limit flexibility, and they limit cash flow.

To address and overcome these issues, a combination of automation and incentives may be used. Many processes may be automated by automatically creating component items (as with the automatically-created time/use/expense allocations described above) and not requiring explicit approvals of newly-created items. This entails management by exception. Accordingly, the system 100 may be configured to address the needs discussed below.

Review is ideally completed on a regular basis. The main incentive for regular review (and for many other processes described herein) is quick payment for services to the individual rendering the services. Up to a minimum time span, employees and contractors may be able to control the frequency of their own payments by fulfilling review and reporting requirements. One example implementation uses a one-week timeframe for most processes. This keeps information fresh without making the review and approval requirements overly-burdensome because of too short of a cycle time.

Delays in review, when they occur, will ideally have minimal impact. In other words, if, despite the incentives, time/expense allocations for an individual employee/contractor are still late, only that individual should be impacted. In one example implementation, each user must "close out" each week of allocations by digitally signing to verify the accuracy of the allocations and reporting on problems, progress, and plans for the week. If the week isn't closed out, payment for the incomplete/missing allocations may be delayed or not made at all. Because this incentive is mainly effective for promoting time allocations and reimbursements, the example implementation described herein allows for other expenses to be allocated and edited by many other users.

Review will ideally require minimal effort. The example implementation described herein may meet this need by gathering all vital information in a single interface. This interface may be designed to make key values clearly evident. This may include flagging certain allocation types as favorable or unfavorable based on funding considerations, urgency, or the like. The interface may also be designed to facilitate drilling down to details, as well as making problems stand out so that they can easily be identified and corrected.

When problems are discovered, the system will ideally allow them to be resolved with minimal effort. The example implementation described herein may meet this need by giving stakeholders editing privileges appropriate to their position/need, by making it possible to edit from any access point in the drilldown noted above, and by automatically notifying all other impacted stakeholders when edits take place.

For example, credit card expenses may be processed such that all transactions are linked to specific individuals, and transaction information is passed to the users without any need to access bank/card provider systems. To the extent that automatic allocations are possible as described above, a credit card purchase of an item/service used for a project with a cost-plus type contract may automatically go from point of sale to allocated to invoiced and paid with full visibility of all aspects of the process by all involved parties in one system. (The component transactions take place in other systems, but information about them is passed to or gathered by a single system, which allows for editing and/or viewing the transaction details.

Invoice expenses may be screened to extract key values, then directed and allocated in the same way as credit card expenses. If the invoices are submitted through a payment portal, no screening may be needed. Certain users may examine a controller checks panel on a weekly basis, and these users may verify that they have reviewed the summary information for accuracy and address problems as needed. A timeline and editing rights setup may allow most problems to be addressed immediately.

As noted above, editing and visibility of items and allocations may be available to some or all stakeholders in real time, with clearly-defined limitations and deadlines for editing. The system may limit who can allocate to what, when the allocations can be made, and may prohibit certain types of allocations by certain users, and/or may trigger alerts/notifications when certain limits are passed, certain users make allocations/edits, or the like. The system may support ad-hoc adaptations of these limitations and/or creation of additional rules and/or notification triggers.

Where applicable, overtime and/or bonus pay allocations may be made automatically based on rules that flag consecutive time past a given threshold for the higher rate. Another approach may allow accepting manual input if more than one project is involved. This manual input may allow any time during the period to be flagged for the higher rate.

Human resource processes may also be automated, and may in certain embodiments be tied to the close-your-week-to-get-paid incentive described above. As with nearly all other system components, these elements may be directly built into the main system or some or all of them may be indirectly integrated from third-party providers. Also common with other elements is the ability of the central analysis/processing system 108 shown in FIG. 1 to make use of the data specified not only to inform automatic allocations, but also to weight the information as it is processed by the algorithm. For example, if the analysis/processing system 108 shows that a user is near two different machines for a given time, it may choose which machine to allocate against based on which machine is listed in the profile for that person. If both machines are listed, the algorithm may give additional weight to the machine for which the user has a higher certification higher. Alternatively, or additionally, the analysis/processing system 108 may evaluate historical information (e.g., which machine was used or primarily used by the user in the past) to select the machine.

Specific human resource elements/processes that may be automated and/or tied to incentives may include hiring and onboarding; profile updates including providing/updating pictures, expertise/skills information, tax withholding, etc.; benefits setup and maintenance; peer ratings/evaluations, both overall and in specific skills/areas of expertise; granting and tracking trainings and certifications, both mandatory and optional; and termination.

Other processes and incentives may also be established. For example, an interface for submitting daily/weekly reports may be built into the system 100 and serve as a proactive way to gather information that otherwise would only be reported with extra effort on the part of the individual. This information may be used by the automatic allocation algorithm to determine how to allocate time, use, or expenses. An interface may also be provided to provide and manage benefits, such as health benefits.

Figure 17:
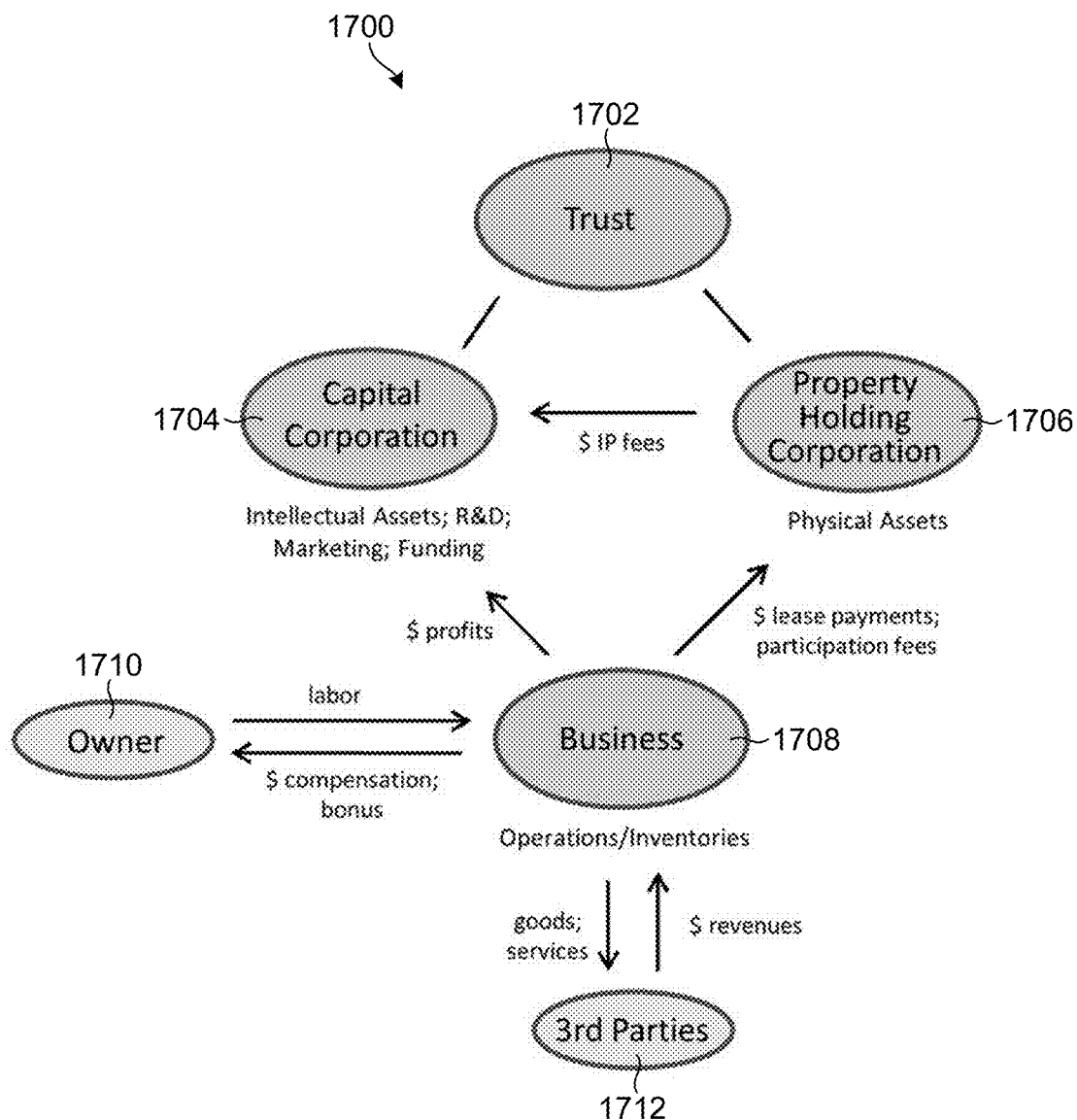
FIG. 17 is a high-level block diagram showing business relationships and flow of monies in a cooperative network of businesses.
Figure 18:
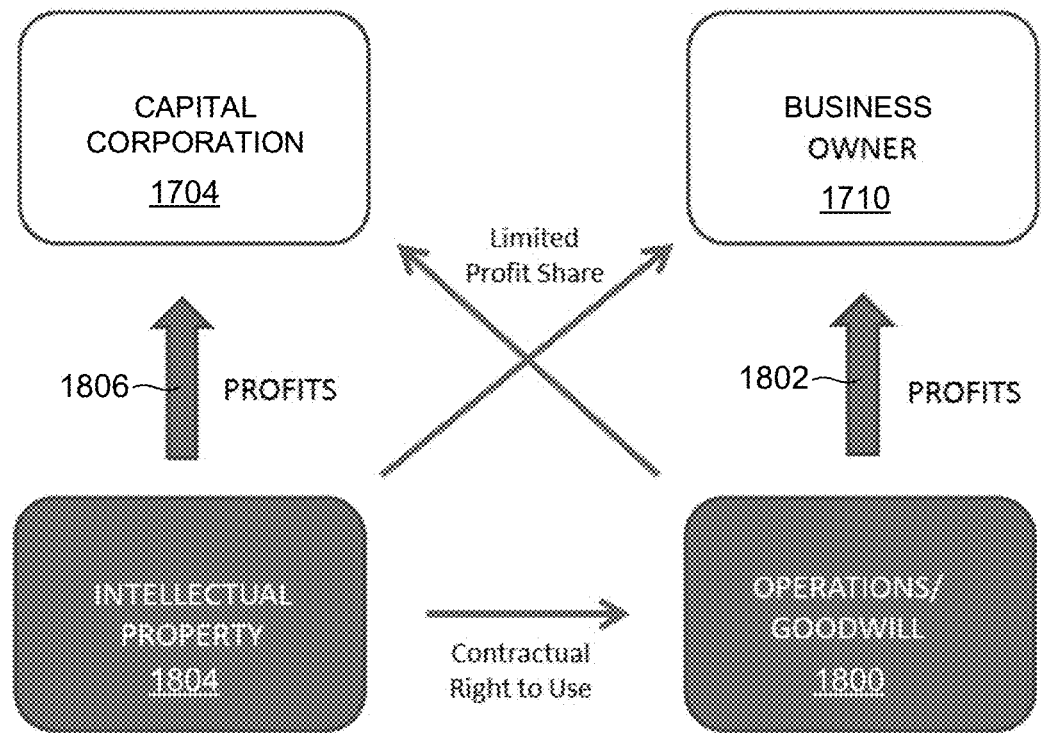
FIG. 18 is a high-level block diagram showing business relationships and flow of profits in a cooperative network of businesses.
Figure 19:
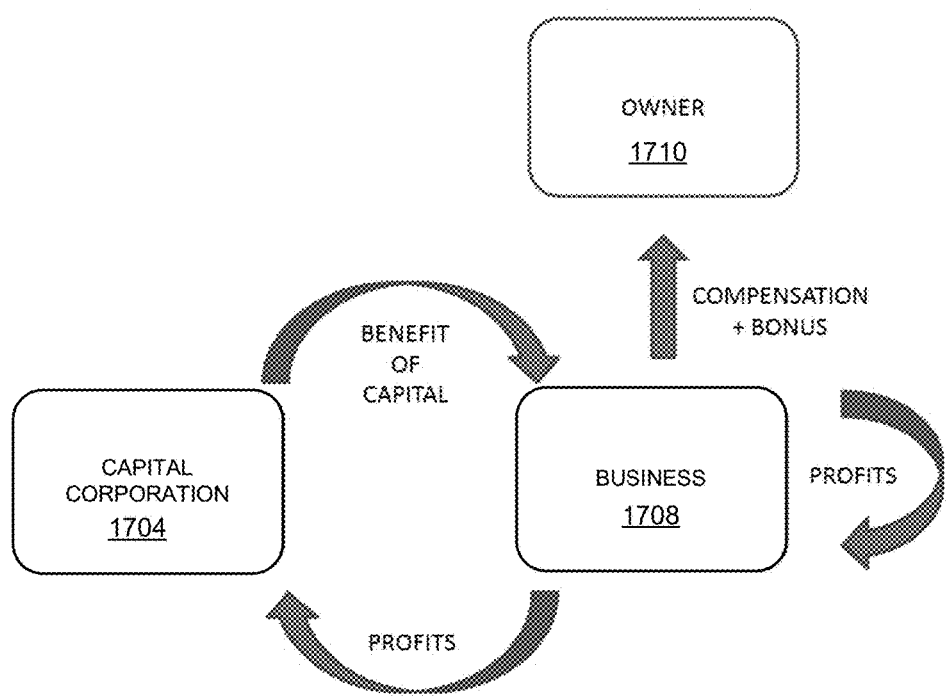
FIG. 19 is a high-level block diagram showing reinvestment of capital in a cooperative network of businesses.

Referring generally to FIGS. 17 through 19, supply and demand market forces work best when the entities involved are independent, but independence is often trumped by market forces that promote consolidation. Consolidation brings many disadvantages, ranging from reduced flexibility to diffusion of responsibility to counterproductive optimization of only certain portions of the consolidated business. To date, few alternatives to consolidation have proven viable.

The alternative described in association with FIGS. 17 through 19 is a hybrid system that allows independent entities to work together and makes use of automatic allocations and other business processes described above. As noted in the explanation associated with FIG. 1, the analysis/processing system 108 may be configured to pass output to external systems. Because of this, various of the benefits described herein in terms of a single business/operation may also be realized across multiple businesses as otherwise independent business systems participate in a network that exchanges data and operates on common time lines and within the framework described and illustrated in FIGS. 17 through 20.

Advantages of the system/network include self-regulated optimization, increased focus on primary functions of each entity, and novel methods for funding new entities. At the same time, the network has many of the benefits of consolidation, without its drawbacks. These benefits include controlled coordination and cooperation, centralized and specialized support functions (accounting, human resources, information technology, intellectual property, etc.), and economies of scale in terms of capital resources (and thus the availability of resources that may otherwise be cost prohibitive for smaller independent entities).

One implementation or embodiment of a networked group of businesses and individuals has the following features (involved parties may establish all of the key parameters of the relationship by mutual agreement): Capital resources and support services (including data exchange and business automation services as described above) may be directly provisioned to individually-owned businesses 1708 by a large capital provider 1704 ("capital corporation" 1704). The capital corporation 1704 may allow each business 1708 to operate independently while simultaneously offering the advantages of a large organization. The owner 1710 holds an interest in his or her own business 1708 and also in the larger system 1700. The capital corporation 1704 provides intellectual assets and intangibles and owns and obtains protections for all intellectual property (IP), such as IP generated by the businesses 1708. The IP is licensed to the businesses 1708, and each business owner 1710 has a legally binding right to share proceeds from IP transactions (e.g., sale of IP, licensing of IP, etc.). The capital corporation 1704 may invewherest in the development of a business 1708 and its IP, and startup expenses are treated as investments in IP. Development expenses may include costs related to testing, reduction to practice, market studies, early stage marketing, operating expenses, base compensation to the business owner 1710, and the like. Part of the arrangement may set terms for a base compensation paid to the business owner 1710. In certain cases, this base compensation is set at a minimal living wage as opposed to market-rate compensation. As the business 1708 becomes profitable, the compensation may increase as detailed below.

A property holding corporation 1706 may provide and invest in space, furniture, and major equipment. It may own all real property and may lease or license it to businesses 1708 at fair value on a shared or exclusive-use basis. It may also provide or arrange for support services, and a manager or board from the property holding entity 1706 serves as a general advisor to a business 1708 and monitors performance, adherence to terms, and the like. In this embodiment, both the capital corporation 1704 and the property holding corporation 1706 are controlled by a trust 1702. There may be no individual owners of the platform, and the trust 1702 may be established for the benefit of participants. This structure guarantees the continuity of the system and creates fiduciary duties to participants.

In certain embodiments, each individual entity 1708 is organized as an S-Corporation with a single owner 1710 that chooses its own name, has its own bank account, executes its own business plan, and is responsible for its own commitments. Each entity 1708 may own several types of assets: tools, inventories (including work in progress), accounts receivable, supplies, consumables, contract rights relating to the business (including licenses), name, goodwill, customer lists, and cash in bank accounts. The business owners 1710 may receive a legally binding stewardship covering all assets, with rights to use identified space and equipment, rights to use IP within a defined field of business 1708, full control of the business 1708 and all of its assets, and rights in the increase of the business 1708 and a share of proceeds from the IP it creates. The owners 1710 may, in certain embodiments, withdraw the full or partial value of this stewardship if leaving the system 1700, but the capital corporation 1704 may be entitled to recover its investments. The right of an owner 1710 to share in proceeds from IP transactions held by the capital corporation 1704 may also terminate upon exit. Each business 1708 may be required to pay a participation fee (possibly based on a percentage of revenues), which may allow the capital corporation 1704 to completely or partially cover the costs of its services and expenses.

The capital corporation 1704 may account for all expenses and investments that are associated with a business 1708. All such expenses and investments, optionally augmented by some percentage/rate, may constitute a preferential return to the capital corporation 1704 and may be recouped before the business owner 1710 may share in business profits. Once the preferential return is paid, the business owner 1710 and the capital corporation 1704 may share profits of the business 1708, with adjustments (if necessary) to assure payment of the owner's base compensation and participation fees, and potentially with a cap on the return on investment to the capital corporation 1704.

The relationship between the businesses 1708 and the capital corporation 1704 may be fundamentally different from traditional funding. In a traditional funding arrangement, all business assets are typically put into an operating company, a bank takes a security interest in all of the company's assets, and a venture capitalist takes a percentage ownership in the company itself. In the approach detailed herein and illustrated in FIG. 18, the business owner 1710 owns specific assets 1800 and shares profits 1802 derived from those assets 1800, the capital corporation 1704 invests in intellectual assets 1804 and shares profits 1806 derived from those assets 1804, and the property holdings corporation 1706 owns specific assets, which it leases.

As shown in FIG. 19, in this implementation, the capital and property holding corporations 1704, 1706 do not necessarily invest cash in new businesses 1708 with the expectation of receiving a cash payout, but maintain a platform of intellectual property and physical assets that can support a community of businesses 1708. So long as the individual business owners 1710 participate in the community, each may be expected to keep capital within the community. Profits that aren't used to satisfy reasonable needs and wants of the owner 1710 are ideally reinvested in the business 1708 or the community.

Any business owner 1710 may sell all of the assets of his or her business 1708. Such a sale of operational assets may be required to generate sufficient proceeds to cover the agreed-on investment return. With the cooperation of the capital corporation 1704, the owner 1710 may sell the business 1708 as a whole, including intellectual property. The reinvestment requirement described above applies to the proceeds of a sale. Such proceeds may be distributed first to the capital and property holding corporations 1704, 1706 to allow them to recoup their investments, and then in accordance with percentages pertaining to intellectual property transactions.

The network business relationship may come to an end in other ways. For example, the capital corporation 1704 may discontinue support for a business 1708, in which case the owner 1710 may retain the value of assets and in some cases retain exclusive rights in intellectual assets. In other cases, a business owner 1710 may resign from the business 1708 and turn all of the assets over to the property holding corporation 1706. With the cooperation of the capital and property holding corporations 1704, 1706, a business owner 1710 may sell the business 1708 to another network participant. In other cases, an owner 1710 may sell the operations of the business 1708 to someone outside the network, including nonexclusive rights in intellectual assets, or, with the cooperation of the capital corporation 1704, with exclusive rights in intellectual assets. An owner 1710 may also negotiate a separation from the network and buy out the capital corporation's interest in the business 1708.

Figure 20:
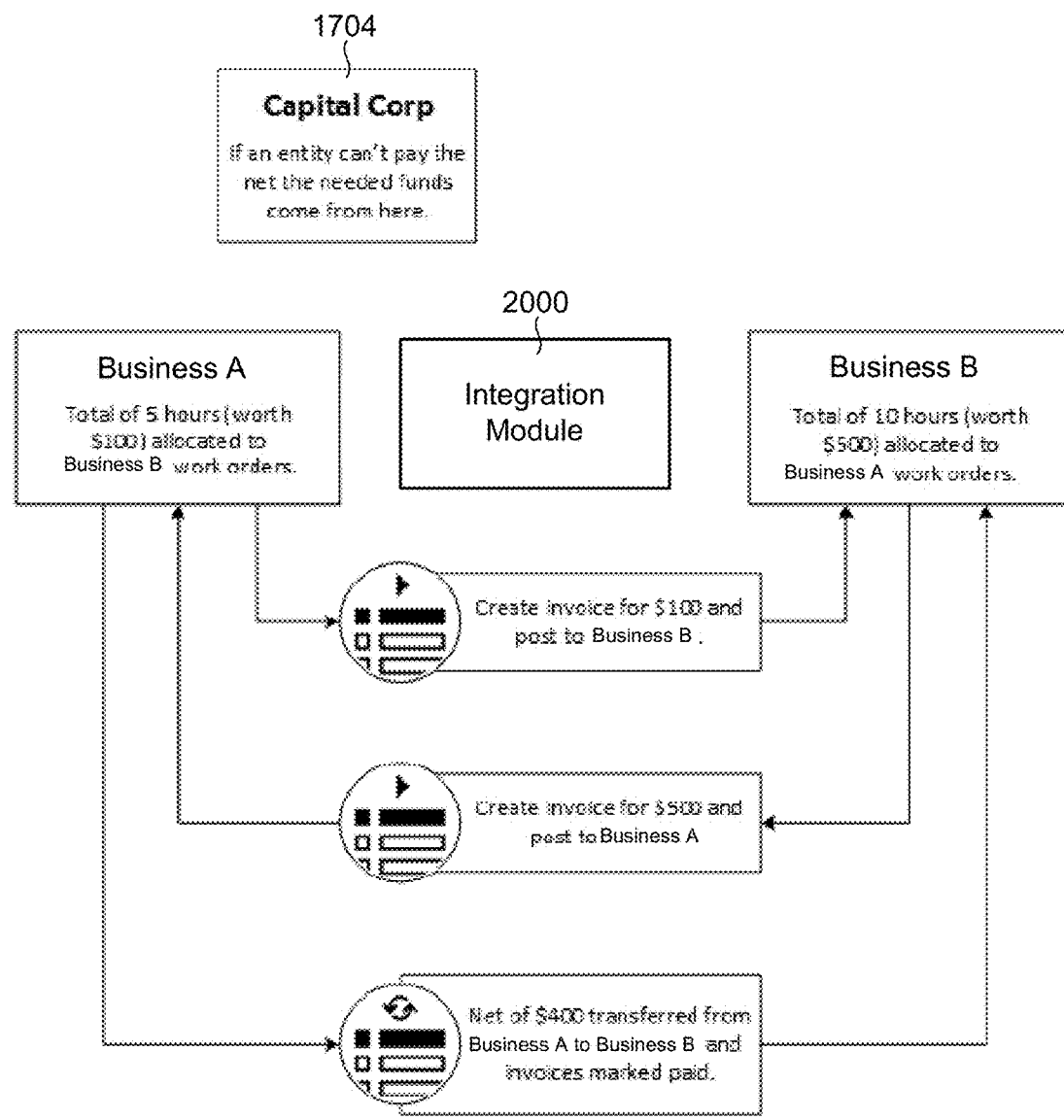
FIG. 20 is a high-level block diagram showing how an integration module in accordance with the invention may be used to facilitate transactions and flow of monies in a cooperative network of businesses.

Referring to FIG. 20, in certain embodiments in accordance with the invention, an integration module 2000 in accordance with the invention may be provided to facilitate transactions between the community of businesses 1708, the capital corporation 1704, the property holdings corporation 1706, and the like. In traditional economic models made up of independent businesses, each business will typically utilize an accounting platform (e.g., QuickBooks, Peachtree, etc., including online versions of each) to perform bookkeeping and accounting functions. These functions may include, among others, keeping track of accounts receivable, accounts payable, general ledger items, billing, stock/inventory, purchase orders, sales orders, expenses, debt collection, payroll, timesheets, electronic payment processing, and the like. Each independent business must typically use and maintain their own copy of the accounting platform, as well as make sure the information contained therein is accurate and up-to-date. This can be a significant burden on a business and may take away from time performing key work and functions of the business.

In general, most accounting packages implement double-entry bookkeeping, wherein each entry to an account is offset by a corresponding entry to a different account. These entries may occur in asset, liability, income, expense, capital, or other accounts. Transactions that occur between businesses may require bookkeeping entries in each of the business's books. For example, a transaction between business A and business B (e.g., sale of a product from business A to business B, provision of a service from business A to business B, etc.) may require both businesses to update their books to record the transaction. Personnel may be required at both business A and business B to properly record these transactions in their respective accounting systems. Time and effort required by both business A and business B to perform the transaction and associated accounting reduces the efficiency of both businesses. Further inefficiencies may be present when additional businesses are parties to a transaction.

An integration module 2000 in accordance with the invention may help to facilitate transactions within the community of businesses 1708 described herein by allowing transactions to occur between businesses 1708, the capital corporation 1704, and the property holdings corporation 1706 in a more seamless manner. Specifically, the integration module 2000 may function as a type of middleware between the accounting systems of the businesses 1708, the capital corporation 1704, and the property holdings corporation 1706. In certain embodiments, the integration module 2000 accesses the different accounting systems through application programming interfaces (APIs) thereof. When a transaction occurs between business A and business B, the integration module 2000 may make appropriate entries in the books of both business A and business B to properly record the transaction. In essence, "double-entry bookkeeping" becomes automated quadruple- or sextuple-entry bookkeeping depending on the number of parties involved and the number of accounting systems that are updated by the integration module 2000.

The integration module 2000 may also be configured to reduce a number of payments that are transferred between businesses. For example, if business A performs work for business B in the amount of $1200 and business B performs work for business A in the amount of $500, under normal conditions business A may send an invoice for $1200 to business B and business B may send an invoice for $500 to business A. This would result in two separate invoices and two different payments to satisfy the invoices. Because the integration module 2000 may access each of the businesses' accounting systems, the integration module 2000 may calculate a net amount owed between entities. In the example provided above, business B would owe business A $700 ($1200−$500). A single payment of $700 may be made from business B to business A instead of the two separate payments described above. When this payment is made, the integration module 2000 may update the books for business A and business B to indicate that both invoices have been submitted and paid. This functionality may be extended to transactions between more than two entities, where a net amount owed between entities is calculated and a single or smaller number of payments are made.

FIG. 20 shows one example of a transaction that may be facilitated by an integration module 2000 in accordance with the invention. In the illustrated embodiment, business A performs a total of five hours of work (worth $100) on work orders for business B. An invoice to business B is created in business A's accounting system for $100. Similarly, business B performs a total of 10 hours of work (worth $500) on work orders for business A. An invoice to business A is created in business B's accounting system. Once the week (or other selected time period) has closed, the integration module 2000 determines the net payment of $400 ($500−$100) that needs to flow from business A to business B. The integration module 2000 pulls the $400 from business A and transfers it to business B as park of weekly funding. The integration module 2000 marks both invoices as paid in the accounting systems of business A and business B. If sufficient funds are not available in business A's account, the funds may be pulled from the account of the capital corporation 1704 and an invoice in created for repayment. The integration module 2000 may recoup funds over time or all at once and may send alerts for specific in-the-red thresholds.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method of automatically tracking assets and gathering
   information associated therewith, the method comprising:
   providing a tracking beacon proximate to a shared asset, wherein the shared asset is contemporaneously used by two or more separate business entities;
   the tracking beacon comprising a tilt plate comprising a front side and a back side, the front side comprising an outer touch surface and the back side comprising electronic components mounted thereon and the back side further comprising a raised center pivot and a plurality of spring loaded switches mounted thereon disposed around the periphery of the back side of the tilt plate such that by tilting the plate by pressing proximate the periphery of the outer touch surface two or more of the spring loaded switches mounted on the back side of the tilt plate are activated;
   the spring-loaded switches alone or in combination controlling one or more assets;
   wirelessly monitoring, with an asset tracking system, a location of the shared asset using the tracking beacon;
   manually inputting information associated with the shared asset through an input element incorporated into the tracking beacon comprising a touch screen; and
   updating an accounting system based on the information.

2. The method of claim 1, wherein the input element comprises at least one button.

3. The method of claim 1, further comprising gathering, using at least one sensor incorporated into the tracking beacon, environmental information associated with the shared asset.

4. A system for automatically tracking shared assets and gathering information associated therewith, the system comprising:
- a least one processor;
- at least one memory device operably coupled to the at least one processor and storing instructions for execution on the at least one processor, the instructions causing the at least one processor to:
- associate a tracking beacon with a shared asset, wherein the tracking beacon is disposed proximate to the shared asset, and where the shared asset is contemporaneously used by two or more separate business entities;
- the tracking beacon comprising a tilt plate comprising a front side and a back side, the front side comprising an outer touch surface and the back side comprising electronic components mounted thereon and the back side further comprising a raised center pivot and a plurality of spring loaded switches mounted thereon disposed around the periphery of the back side of the tilt plate such that by tilting the plate by pressing proximate the periphery of the outer touch surface two or more of the spring loaded switches mounted on the back side of the tilt plate are activated;
- the spring-loaded switches alone or in combination controlling one or more assets;
- wirelessly monitor a location of the shared asset through an input element comprising a touch screen incorporated into the tracking beacon;
- wirelessly transmit the information from the tracking beacon to the shared asset tracking system; and
- update an accounting system based on the transmitted information.

5. The system of claim 4, wherein the input element comprises at least one button.

6. The system of claim 4, wherein the instructions further cause the at least one processor to gather, using at least one sensor incorporated into the tracking beacon, environmental information associated with the shared asset.

7. A computer program product to automatically track shared assets and gather information associated therewith, the computer program product comprising:
- a non-transitory computer-readable storage medium having computer-usable program code embodied therein, the computer-usable program code comprising:
- computer-usable program code that associates a tracking beacon with a shared asset, wherein the tracking beacon is disposed proximate to the shared asset, and wherein the shared asset is contemporaneously used by two or more separate business entities;
- the tracking beacon comprising a tilt plate comprising a front side and a back side, the front side comprising an outer touch surface and the back side comprising electronic components mounted thereon and the back side further comprising a raised center pivot and a plurality of spring loaded switches disposed around the periphery of the back side of the tilt plate such that by tilting the plate by pressing proximate the periphery of the outer touch surface two or more of the spring loaded switches mounted on the back side of the tilt plate are activated;
- the spring-loaded switches alone or in combination controlling one or more assets;
- computer-usable program code that wirelessly monitors a location of the shared asset using the tracking beacon and record the location of a shared asset tracking system;
- computer-usable program code that wirelessly transmits the information from the tracking beacon to the shared asset tracking system, and
- computer-usable program code that updates an accounting system based on the transmitted information.

8. The computer program product of claim 7, wherein the input element comprises a least one button.

* * * * *